(12) United States Patent
Mody et al.

(10) Patent No.: US 9,684,499 B2
(45) Date of Patent: Jun. 20, 2017

(54) SYSTEMS AND METHODS FOR FACILITATING INSTALLATION OF SOFTWARE APPLICATIONS

(71) Applicant: Dropbox, Inc., San Francisco, CA (US)

(72) Inventors: Viraj Mody, San Francisco, CA (US); Thomas Carriero, San Francisco, CA (US); Matthew Holden, San Francisco, CA (US); Zach Kagin, San Francisco, CA (US); Allison House, San Francisco, CA (US); Alice Lee, San Francisco, CA (US); Luke Faraone, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 95 days.

(21) Appl. No.: 14/083,645

(22) Filed: Nov. 19, 2013

(65) Prior Publication Data

US 2015/0007167 A1     Jan. 1, 2015

Related U.S. Application Data

(60) Provisional application No. 61/841,413, filed on Jun. 30, 2013.

(51) Int. Cl.
*G06F 9/445* (2006.01)
(52) U.S. Cl.
CPC ...................... *G06F 8/61* (2013.01)
(58) Field of Classification Search
None
See application file for complete search history.

(56) References Cited

U.S. PATENT DOCUMENTS

| | | | |
|---|---|---|---|
| 5,734,642 A * | 3/1998 | Vaishnavi | H04L 12/26 340/3.51 |
| 6,944,859 B2 | 9/2005 | Bunger | |
| 7,657,257 B2 | 2/2010 | Cricco et al. | |
| 7,818,467 B2 | 10/2010 | Anwer | |
| 7,877,746 B2 | 1/2011 | Kahan et al. | |
| 8,250,571 B2 * | 8/2012 | Tseng | G06F 8/61 717/177 |
| 8,433,776 B2 | 4/2013 | Bengtsson et al. | |
| 8,510,548 B1 * | 8/2013 | Markov | H04L 63/145 713/150 |

(Continued)

OTHER PUBLICATIONS

International Search Report, issued May 29, 2014 in counterpart International Application No. PCT/US2014/017753.

(Continued)

*Primary Examiner* — Chat Do
*Assistant Examiner* — Douglas Slachta
(74) *Attorney, Agent, or Firm* — Polsinelli PC

(57) ABSTRACT

In at least one embodiment, a system for facilitating installation of a software application is provided. The system includes a communications component configured to communicate with external devices, and a processor configured to detect an intent to install the software application to a computing device, cause the communications component to provide an installer of the software application for retrieval by the computing device, and direct the communications components to communicate with a mobile device such that the mobile device serves as a guide in installation of the software application to the computing device.

21 Claims, 22 Drawing Sheets

(56) References Cited

U.S. PATENT DOCUMENTS

| | | |
|---|---|---|
| 2003/0121033 A1 | 6/2003 | Peev et al. |
| 2004/0006538 A1* | 1/2004 | Steinberg et al. ............... 705/39 |
| 2006/0253851 A1 | 11/2006 | Cho et al. |
| 2008/0091947 A1* | 4/2008 | Dancer et al. ................. 713/171 |
| 2008/0214172 A1* | 9/2008 | Anwer ........................... 455/419 |
| 2009/0111453 A1* | 4/2009 | Hsu ........................... G06F 8/61 |
| | | 455/419 |
| 2010/0103824 A1* | 4/2010 | Gilmour ............. H04L 43/0817 |
| | | 370/245 |
| 2010/0146500 A1* | 6/2010 | Joubert et al. ................. 717/178 |
| 2010/0153944 A1* | 6/2010 | Qu ........................... H04L 67/34 |
| | | 717/177 |
| 2010/0281364 A1 | 11/2010 | Sidman |
| 2010/0325194 A1* | 12/2010 | Williamson ............ H04W 4/02 |
| | | 709/203 |
| 2011/0154135 A1 | 6/2011 | Tyhurst et al. |
| 2011/0214121 A1* | 9/2011 | Gentile ................. H04L 43/065 |
| | | 717/177 |
| 2011/0270929 A1* | 11/2011 | Harrang et al. ............... 709/205 |
| 2012/0077586 A1 | 3/2012 | Pishevar |
| 2012/0079095 A1* | 3/2012 | Evans et al. .................. 709/224 |
| 2012/0151354 A1* | 6/2012 | Robbins et al. ............... 715/735 |
| 2012/0203862 A1 | 8/2012 | Tayeb et al. |
| 2013/0054527 A1 | 2/2013 | Hwang et al. |
| 2013/0054682 A1 | 2/2013 | Malik et al. |
| 2013/0326502 A1* | 12/2013 | Brunsman et al. ........... 717/178 |
| 2014/0082050 A1* | 3/2014 | Chud ..................... H04L 67/10 |
| | | 709/203 |
| 2014/0108810 A1* | 4/2014 | Chenna ........................ 713/179 |
| 2014/0201730 A1* | 7/2014 | Biswas et al. ................ 717/178 |
| 2014/0215457 A1* | 7/2014 | Gava ........................ G06F 8/61 |
| | | 717/178 |
| 2015/0082458 A1* | 3/2015 | Cooper et al. .................. 726/27 |

OTHER PUBLICATIONS

Gibson Research Corporation; "Secure QR Login"; https://www.grc.com/sqrl.htm; Date: Oct. 3, 2013, pp. 1-7.

\* cited by examiner

SYSTEMS AND METHODS FOR FACILITATING INSTALLATION OF SOFTWARE APPLICATIONS

CROSS-REFERENCE TO RELATED APPLICATION

This application claims the benefit of U.S. Provisional Application No. 61/841,413, filed Jun. 30, 2013, the disclosure of which is incorporated by reference herein in its entirety.

FIELD OF THE INVENTION

Various embodiments generally relate to facilitating installation of software applications.

BACKGROUND

As electronic and data processing devices, such as smartphones, laptops, tablets, and PCs, for example, become more affordable, more users are owning multiple devices. Responding to this trend, software providers routinely create software application offerings designed for multiple platforms and devices. Oftentimes, however, a user who already has a particular software application installed on one device may not be aware of other similar software offerings from the same provider for one or more other devices. This may, in large part, be due to software for mobile phones laptops and PCs each being offered from different locations or sources. Accordingly, there is a need to educate users as to software application offerings, promotions and availability, and moreover, to aid in the acquisition and installation of software applications, especially those which may be related to, or versions of, similar applications already installed on some of a user's devices.

SUMMARY

Embodiments are provided for facilitating installation of software applications, and more particularly, for linking mobile and desktop client installations, such as, for example, where a smartphone application is used to facilitate the installation of the same software's PC client on a PC.

In at least one embodiment, a system for facilitating installation of a software application is provided. The system includes a communications component configured to communicate with external devices, and a processor configured to detect an intent to install the software application to a computing device, cause the communications component to provide an installer of the software application for retrieval by the computing device, and direct the communications components to communicate with a mobile device such that the mobile device serves as a guide in installation of the software application to the computing device.

In at least another embodiment, a method for using a mobile device as a guide in installation of a software application is provided. The method includes determining with the mobile device that installation of the software application to a computing device is to be facilitated, acquiring predefined data from a provider of the software application in response to determining, communicating with the provider to obtain information regarding the installation, and presenting on a display of the mobile device at least one message related to the information.

In at least another embodiment, a non-transitory computer readable medium for using a mobile device as a guide in installation of a software application is provided. The computer readable medium includes instructions that, when executed by at least one process of the mobile device, cause the mobile device to receive a request to facilitate installation of the software application to a computing device, acquire predefined data from the computing device using an image capturing component of the mobile device, communicate with a provider of the software application to obtain information regarding the installation, and present on a display of the mobile device at least one message related to the information.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Methods, systems, and computer readable mediums for facilitating installation of software applications, and more particularly, for linking mobile and desktop client installations are provided. Instructions for installation of a software application and/or a demonstration of features thereof may be displayed within a user interface on a first device, such that the first device serves as a companion or a guide for installation of the software application and/or features thereof on the second device. The first device may poll a software service provider, such as a content management system, to determine progress on the installation, and may display instructions and/or demonstrations within a user interface to inform the user of such progress. In particular, a client application for a software service that is installed on a first device may serve as a guide for an installation of software on the second device that is offered by the same software provider.

By way of example, a client application on a mobile phone provided for use with a content management service may be used as a guide and/or intermediary for installation of a similar client application on a desktop computer. This often arises with younger users, who may upload photos or other media (e.g., taken or captured with their smartphone) to a content management system. Such users may not have the client application on any other device, although they may own and use a PC, tablet, or the like. Thus, in accordance with some embodiments, systems are provided to facilitate installation of the client application (or one similar thereto), which may already be installed on a user's first device (e.g., smartphone), to a second device (e.g., desktop PC, tablet, or the like). The content management system, which provides or supports the client applications, may update the first device on the progress of the installation occurring on the second device. This may provide a way to determine meaningful instructions and/or demonstrations to display on the first device that are in sync with the progress of the installation, and which may guide the installation on the second device and/or educate the user on various features of the software application on either device.

For purposes of description and simplicity, methods, systems, and computer readable mediums according to illustrative embodiments of the present invention will be described for a content storage and management service. However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described may be used for a variety of storage providers/services and types of content, files, portions of files, and/or other types of data.

Figure 1:
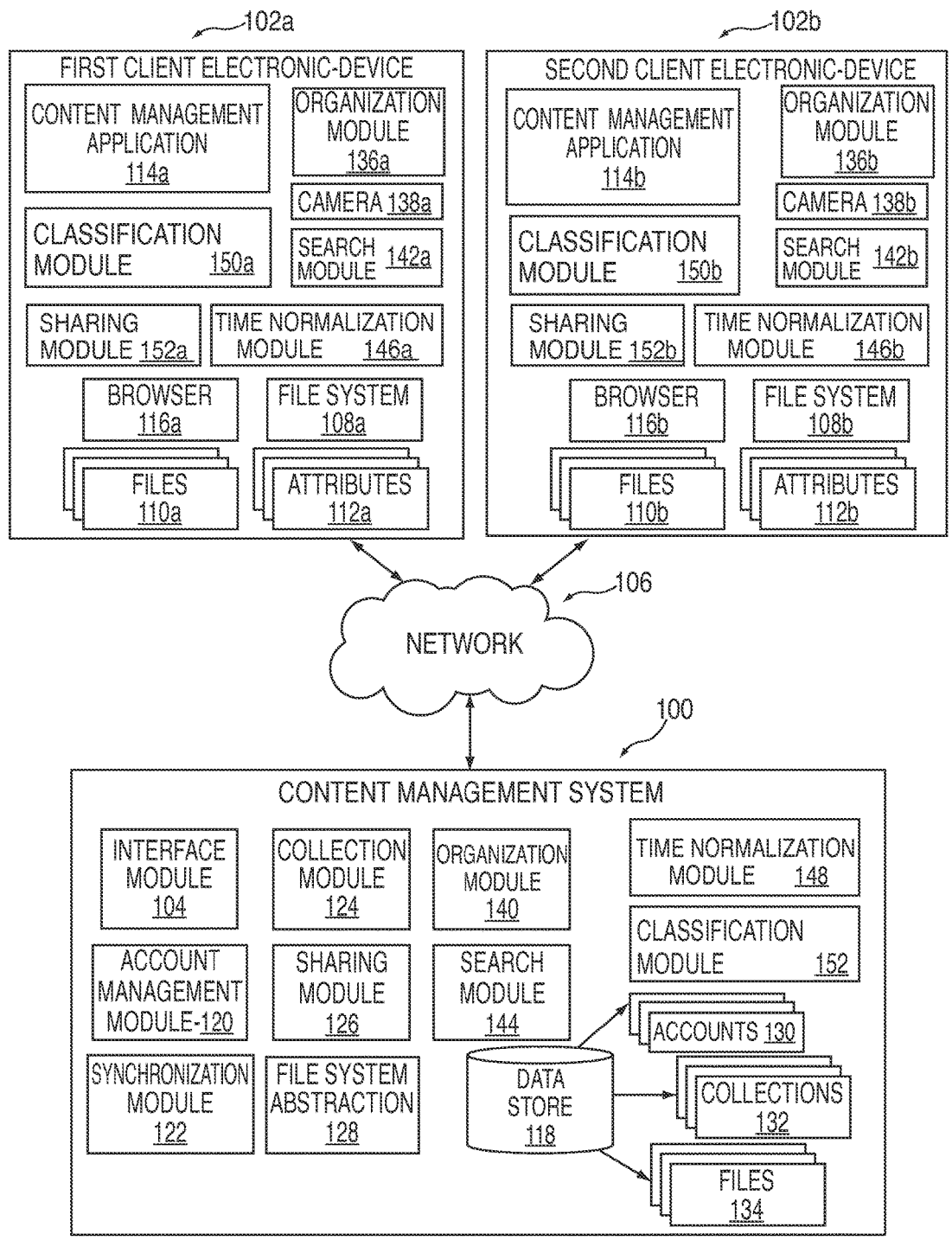
FIG. 1 is an exemplary system in accordance with various embodiments.
Figure 2A:
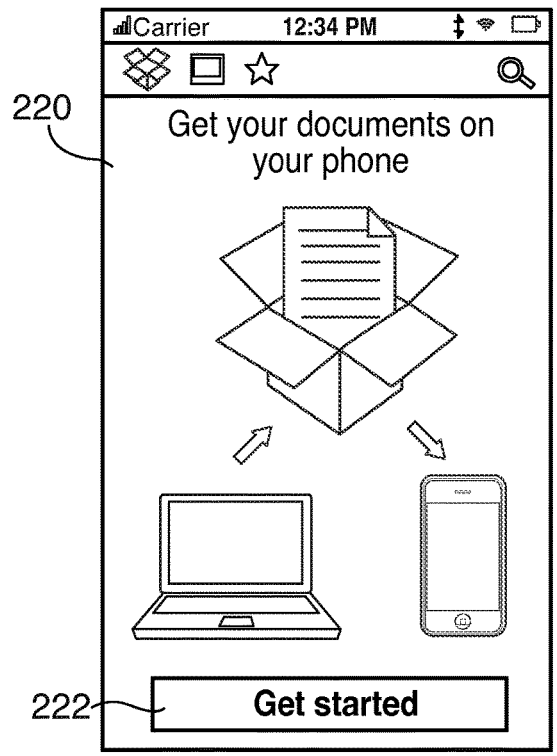
FIGS. 2A-2D, 3A-3C, 4A, and 4B are exemplary user interfaces that may be displayed on a mobile device in accordance with various embodiments.
Figure 2B:
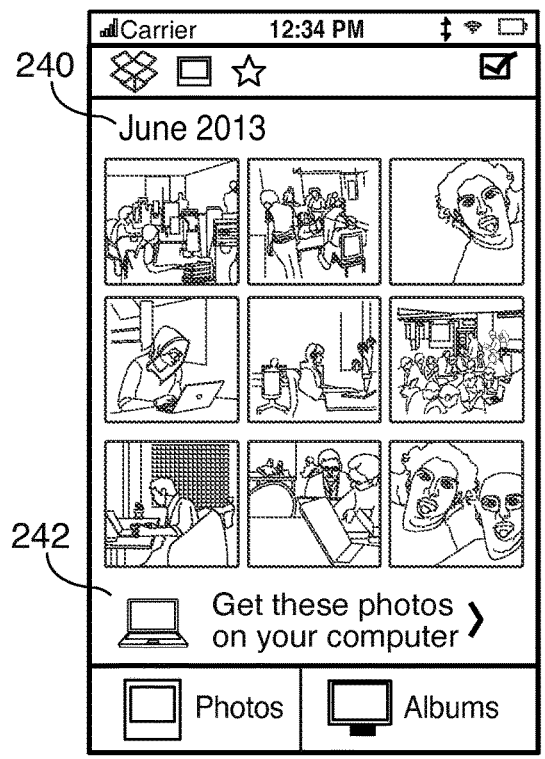
Figure 2C:
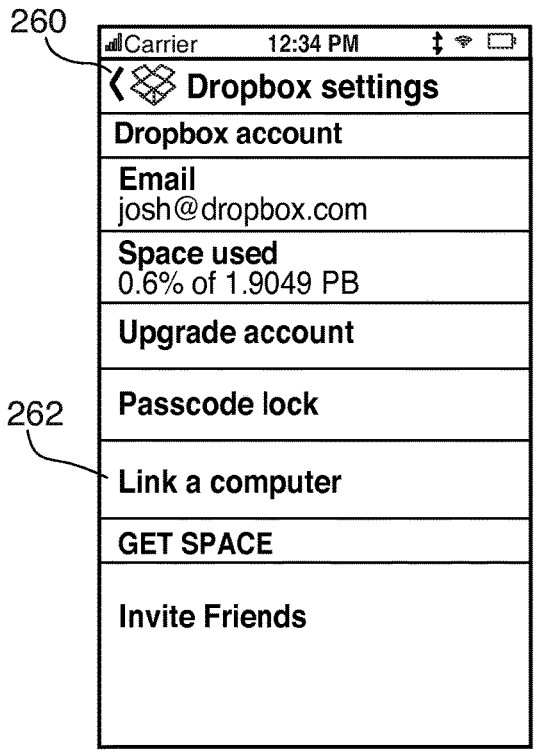
Figure 2D:
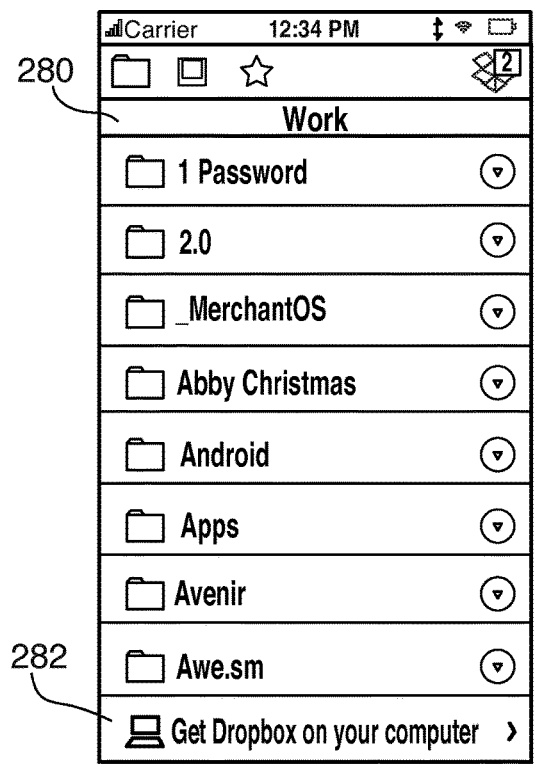

FIG. 1 is an exemplary system 100 in accordance with various embodiments. Elements in FIG. 1, including, but not limited to, first client electronic device 102a, second client electronic device 102b, and content management system 100 may communicate by sending and/or receiving data over network 106. Network 106 may be any network, combination of networks, or network devices that may carry data communication. For example, network 106 may be any one or any combination of LAN (local area network), WAN (wide area network), telephone network, wireless network, point-to point network, star network, token ring network, hub network, or any other configuration.

Network 106 may support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 may communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include, but is not limited to, the following: creation time timestamp, geolocation, orientation, rotation, title, and/or any other attributes or data relevant to the captured image.

Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.\

A time normalization module 146 (e.g., 146a and 146b) may be used to normalize dates and times stored with a content item. An example of time normalization is provided in U.S. patent application Ser. No. 13/888,118, entitled "Date and Time Handling," filed on May 6, 2013, which claims the benefit of U.S. Provisional Patent Application No. 61/801,318, entitled "Date and Time Handling," filed on Mar. 15, 2013, both of which are incorporated herein by reference in their entirety. The time normalization module 146, counterpart time normalization module 148, and/or any combination thereof may be used to normalize dates and times stored for content items. The normalized times and dates may be used to sort, group, perform comparisons, perform basic math, and/or cluster content items.

An organization module 136 (e.g., 136a and 136b) may be used to organize content items (e.g., image files) into clusters, organize content items to provide samplings of content items for display within user interfaces, and/or retrieve organized content items for presentation. An example of organization is described in U.S. patent application Ser. No. 13/888,186, entitled "Presentation and Organization of Content," filed on May 6, 2013, which claims the benefit of U.S. Provisional Patent Application No. 61/794,184, entitled "Presentation and Organization of Content," filed on Mar. 15, 2013, both of which are incorporated herein by reference in their entirety.

The organization module 136 may utilize any clustering algorithm. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items in order to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item. In some embodiments, the search may be handled by searching metadata and/or attributes assigned to content items during the provision of management services. For example, cluster markers stored with images may be used to find images by date. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104 and accessible modules for device 102. Web browser 116a and 116b (collectively 116) may be used to display a web page front end for a client application that may provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 may interact with any number of other modules of content management system 100.

An account may be used to store content, such as documents, text files, audio files, video files, etc., from one or more client devices 102 authorized on the account. The content may also include folders of various types with different behaviors, or other mechanisms of grouping content items together. For example, an account may include a public folder that is accessible to any user. The public folder may be assigned a web-accessible address. A link to the web-accessible address may be used to access the contents of the public folder. In another example, an account may include a photos folder that is intended for photos and that provides specific attributes and actions tailored for photos; an audio folder that provides the ability to play back audio files and perform other audio related actions; or other special purpose folders. An account may also include shared folders or group folders that are linked with and available to multiple user accounts. The permissions for multiple users may be different for a shared folder.

Content items (e.g., files 110) may be stored in data store 118. Data store 118 may be a storage device, multiple storage devices, or a server. Alternatively, data store 118 may be cloud storage provider or network storage accessible via one or more communications networks. Content management system 100 may hide the complexity and details from client devices 102 by using a file system abstraction 128 (e.g., a file system database abstraction layer) so that client devices 102 do not need to know exactly where the content items are being stored by the content management system 100. Embodiments may store the content items in the same folder hierarchy as they appear on client device 102. Alternatively, content management system 100 may store the content items in various orders, arrangements, and/or hierarchies. Content management system 100 may store the content items in a network accessible storage (SAN) device, in a redundant array of inexpensive disks (RAID), etc. Content management system 100 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a file system, or any other collection of data. In one variation, each content item stored in data store 118 may be assigned a system-wide unique identifier.

Data store 118 may decrease the amount of storage space required by identifying duplicate files or duplicate chunks of files. Instead of storing multiple copies, data store 118 may store a single copy of a file 134 and then use a pointer or other mechanism to link the duplicates to the single copy. Similarly, data store 118 may store files 134 more efficiently, as well as provide the ability to undo operations, by using a file version control that tracks changes to files, different versions of files (including diverging version trees), and a change history. The change history may include a set of changes that, when applied to the original file version, produce the changed file version.

Content management system 100 may be configured to support automatic synchronization of content from one or more client devices 102. The synchronization may be platform independent. That is, the content may be synchronized across multiple client devices 102 of varying type, capabilities, operating systems, etc. For example, client device 102a may include client software, which synchronizes, via a synchronization module 122 at content management system 100, content in client device 102 file system 108 with the content in an associated user account. In some cases, the client software may synchronize any changes to content in a designated folder and its sub-folders, such as new, deleted, modified, copied, or moved files or folders. In one example of client software that integrates with an existing content management application, a user may manipulate content directly in a local folder, while a background process monitors the local folder for changes and synchronizes those changes to content management system 100. In some embodiments, a background process may identify content that has been updated at content management system 100 and synchronize those changes to the local folder. The client software may provide notifications of synchronization operations, and may provide indications of content statuses directly within the content management application. Sometimes client device 102 may not have a network connection available. In this scenario, the client software may monitor the linked folder for file changes and queue those changes for later synchronization to content management system 100 when a network connection is available. Similarly, a user may manually stop or pause synchronization with content management system 100.

A user may also view or manipulate content via a web interface generated and served by user interface module 104. For example, the user may navigate in a web browser to a web address provided by content management system 100. Changes or updates to content in the data store 118 made through the web interface, such as uploading a new version of a file, may be propagated back to other client devices 102 associated with the user's account. For example, multiple client devices 102, each with their own client software, may be associated with a single account and files in the account may be synchronized between each of the multiple client devices 102.

Content management system 100 may include sharing module 126 for managing sharing content and/or collections of content publicly or privately. Sharing module 126 may manage sharing independently or in conjunction with counterpart sharing module (e.g., 152a and 152b). Sharing content publicly may include making the content item and/or the collection accessible from any computing device in network communication with content management system 100. Sharing content privately may include linking a content item and/or a collection in data store 118 with two or more user accounts so that each user account has access to the content item. The sharing may be performed in a platform independent manner. That is, the content may be shared across multiple client devices 102 of varying type, capabilities, operating systems, etc. The content may also be shared across varying types of user accounts. In particular, the sharing module 126 may be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). An example of virtual collections is described in U.S. patent application Ser. No. 14/054,103, entitled "Systems And Methods For Presenting Content Items In A Collections View," filed on Oct. 15, 2013, which claims the benefit of U.S. Provisional Patent Application No. 61/750,791, entitled "Presenting Content Items in a Collections View," filed on Jan. 9, 2013, both of which are incorporated herein by reference in their entirety. The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item file to a directory) the content item in another location within data storage in order to place the content item in the collection.

In some embodiments, content management system 100 may be configured to maintain a content directory or a database table/entity for content items where each entry or row identifies the location of each content item in data store 118. In some embodiments, a unique or a nearly unique content identifier may be stored for each content item stored in the data store 118.

Metadata may be stored for each content item. For example, metadata may include a content path that may be used to identify the content item. The content path may include the name of the content item and a folder hierarchy associated with the content item (e.g., the path for storage locally within a client device 102). In another example, the content path may include a folder or path of folders in which the content item is placed as well as the name of the content item. Content management system 100 may use the content path to present the content items in the appropriate folder hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator (URL), which allows any web browser to access the content in content management system 100 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be transmitted to content management system 100 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be transmitted to content management system 100 which may use the received content identification data to identify the appropriate content entry or database row and return the content item associated with the content entry or database TOW.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or false to indicate that a URL to the content item has not been created. Sharing module 126 may be configured to change the value of the flag to 1 or true after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This allows a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Various examples of how a first device (e.g., device 102*a*, or a mobile device such as a smartphone or tablet device) may be used as a guide in installation of a software application to a second device (e.g., device 102*b*, or a computing device such as a desktop PC) are described below with reference to FIGS. 2A through 13.

FIGS. 2A-2D show respective interfaces 220, 240, 260, and 280 that may be displayed on a mobile device (e.g., device 102*a*). As shown in each of FIGS. 2A-2D, each of the interfaces may include one or more user selectable options 222, 242, 262, and 282 for linking the mobile device with one or more other computing devices. Each of user interfaces 220, 240, 260, and 280 may be a web page rendered and displayed by a web browser application. As an example, user interface 280 illustrates a view of a file system hierarchy supported by a content management system, such as content management system 100, and a user interface control including user selectable option 282 to utilize the mobile device as a guide in installation of a software application to a computing device.

Figure 3A:
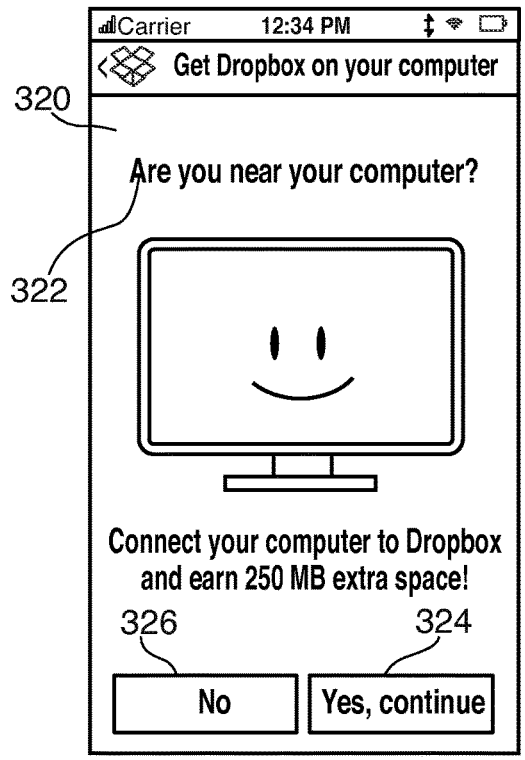
Figure 3B:
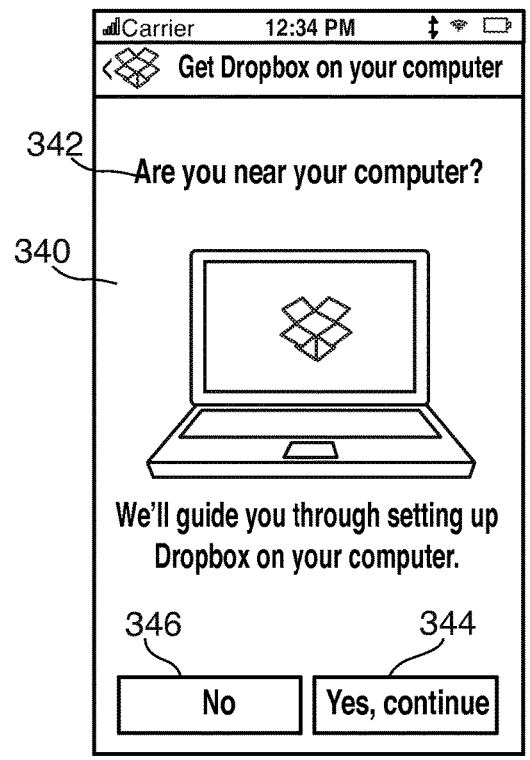

FIGS. 3A and 3B show respective interfaces 320 and 340 that may be displayed on the mobile device when any of user selectable options 222, 242, 262, and 282 is selected. Each of user interfaces 320 and 340 may be a web page rendered and displayed by a web browser application on the mobile device. As shown in FIGS. 3A and 3B, the interfaces may include respective prompts 322 and 342 that each requests a response from a user as to whether the mobile device is near another computing device. Interfaces 320 and 340 also include response options 324 and 344 (e.g., yes) and 326 and 346 (e.g., no) that a user may select to respond to the prompt. Depending on which option is selected, the mobile device may display a different subsequent interface.

Figure 3C:
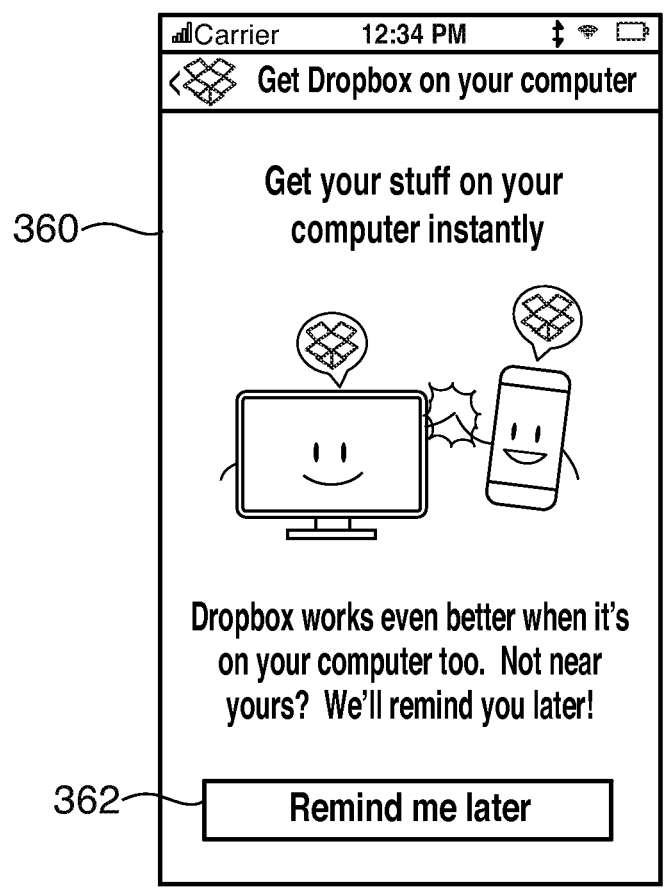

FIG. 3C shows an interface 360 that may be displayed on the mobile device when any of response options 326 and 346 is selected (e.g., a user response that the mobile device is not near another computing device). As shown in FIG. 3C, interface 360 may include a reminder option 362 that a user may select to set a system reminder to automatically prompt the user again at a later time as to whether the mobile device is near another computing device. When option 362 is selected, the client application may, for example, store a state indicative of the user's request to be reminded later. The reminder may be set to trigger based on any number of conditions, including but not limited to the following: when the client application is executed in the future, time (e.g., 6:00 pm or when a user is most likely to be at home, which would make sense in the case that the computing device is a home computer, for example, and the mobile device is a smartphone), day of week, detection of a network connection (e.g., when the mobile device has access to a Wi-Fi network, which would often have additional user devices connected to it as well), and mobile device location. In embodiments where a web browser application is used on the mobile device to connect and interact with the content management system, a similar reminder may be set, for example, as a web browser setting or in the form of one or more browser cookies.

Figure 4A:
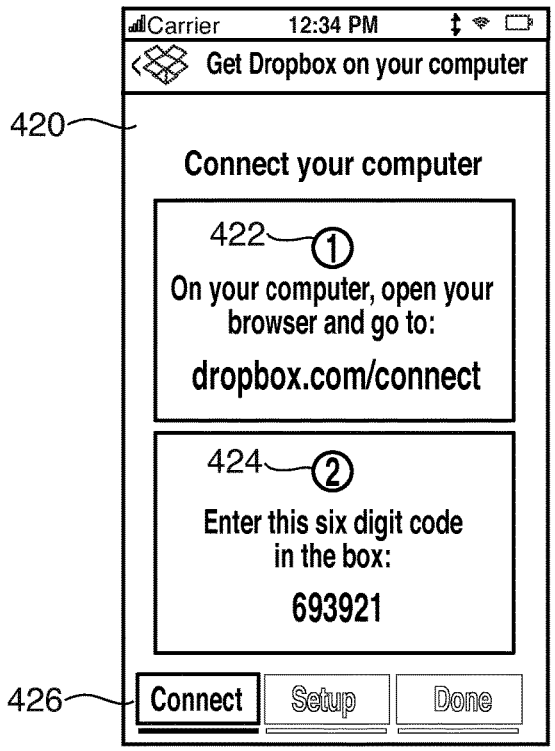
Figure 4B:
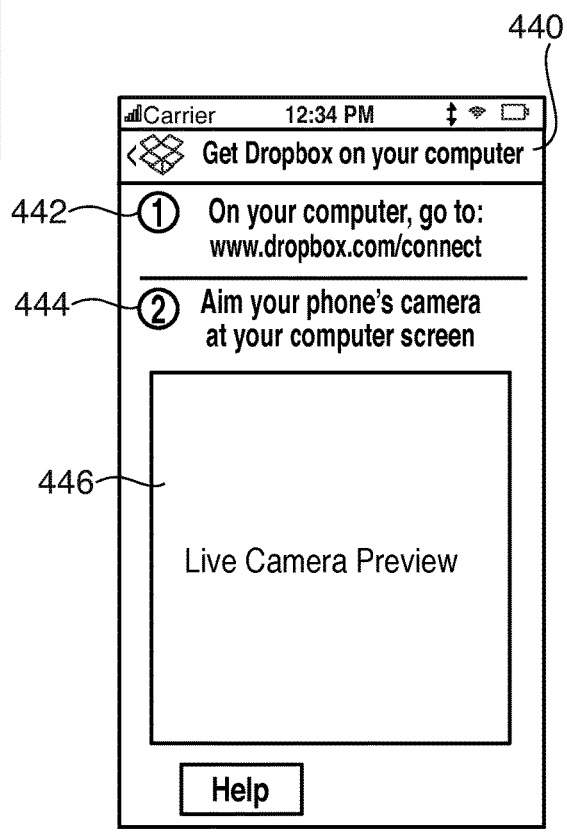

FIGS. 4A and 4B show respective interfaces 420 and 440 that may be displayed on the mobile device when any one of response options 324 and 344 is selected (e.g., a user response that the mobile device is indeed near a computing device).

As shown in FIG. 4A, interface 420 may present predefined data that includes an instruction 422 to instruct a user to use a particular URL to visit a web page on the nearby computing device, as well as an instruction 424 to the user to enter a code in a field or box of the web page (e.g., web page 520 described below). The web page may belong to and be served by a content management system (e.g., content management system 100). Interface 420 may also include a progress indicator 426 that indicates a current progress of a device linking and software application installation procedure (shown here in an exemplary three stage process, with cues "Connect", "Setup" and "Done"). As shown in FIG. 4A, for example, the procedure may be in a "Connect" stage.

Some or all of the information included in instructions 422 and 424 may be transmitted to the mobile device by the content management system. In at least one embodiment, the URL and the code may be transmitted substantially simultaneously to the mobile device when interface 420 is to be displayed. In at least another embodiment, the URL may be previously transmitted and stored in the mobile device, and may simply be retrieved at a later time when interface 420 is to be displayed, whereas the code may be transmitted from the content management system to the mobile device when interface 420 is to be displayed.

The code may be unique, and may be prepared or otherwise generated by the content management system. The content management system may generate the code randomly or near randomly, and may correlate the code with a user account (e.g., a user account associated with the mobile device). A random number generator may, for example, be used to create the nearly unique code, and the generated code may be associated with a user account in a data store. The random number generator may, for example, utilize a seed to create the nearly unique code for the user. The generated code may be active for a predefined time span, and while the generated code is active, the user may be able to download—onto a nearby computing device—an installer and/or metadata identified by the code, which establishes that the software is to be installed on the computing device for the user account. For example, the generated code may only be active for a few hours, and after the predefined time span has elapsed, the installer and the metadata that identifies the user account may no longer be retrieved using the same code.

As shown in FIG. 4B, interface 440 may include an instruction 442 to a user to use the same or a similar URL to visit the same or a similar web page on the computing device, as well as an instruction 444 to aim the camera of the mobile device at a display of the computing device (e.g., to capture a code presented on the display, as described in more detail below). As with instruction 422, the URL may either be previously transmitted to and stored on the mobile device, or may be transmitted to the mobile device when interface 440 is to be displayed. Interface 440 may also include an image capturing preview window 446 that corresponds to the field of view of a camera of the mobile device. The camera may be activated and ready to capture images.

In at least one embodiment, FIGS. 4A and 4B may alternatively be displayed on the mobile device when it is determined (e.g., by either the mobile device or the content management system) that the mobile device is proximate the computing device. For example, the content management system may determine that the mobile and computing devices are proximate one another when information on a status between the mobile device and any other devices is received. The content management system may send a query to the client application of the mobile device for this information when the client application is running or is otherwise being executed by the mobile device. The content management system may alternatively send a query (e.g., in the form of applets) to a web browser application of the mobile device when the user is logged into the content management system's server via the browser. Any such queries received by the mobile device may be directed to one or more operating system services to identify a status of the mobile with respect to other computing devices. As one example, the status may be a state of the mobile device indicative of a network connection between the mobile device and other devices (e.g., based on communication logs with other devices on the same home network and sharing similar Internet Protocol ("IP") addresses, or the like). As another example, the status may include information provided by a third-party device or application having location aware or location-based services (e.g., positioning devices, such as Global Positioning System (GPS) devices, radar or infrared based devices, or the like) installed or provided on the mobile device. In this example, the third-party application may include an interface function call that returns information on the locations of the mobile and computing devices and whether the devices are in close enough proximity to allow the mobile device to serve as the guide. A predefined distance between the devices may be established to ensure that the distance between devices allows for the mobile device to serve as a guide for the installation and/or to demonstrate features thereof. Devices may be determined to be in close proximity if the devices are within a particular distance from each other (e.g., two feet, four feet, etc.). As yet another example, the status may include an operating system or interface function call (e.g., a Bluetooth function call) that may provide information on known devices in communication (e.g., via a port) with and in close proximity to the mobile device.

Figure 5A:
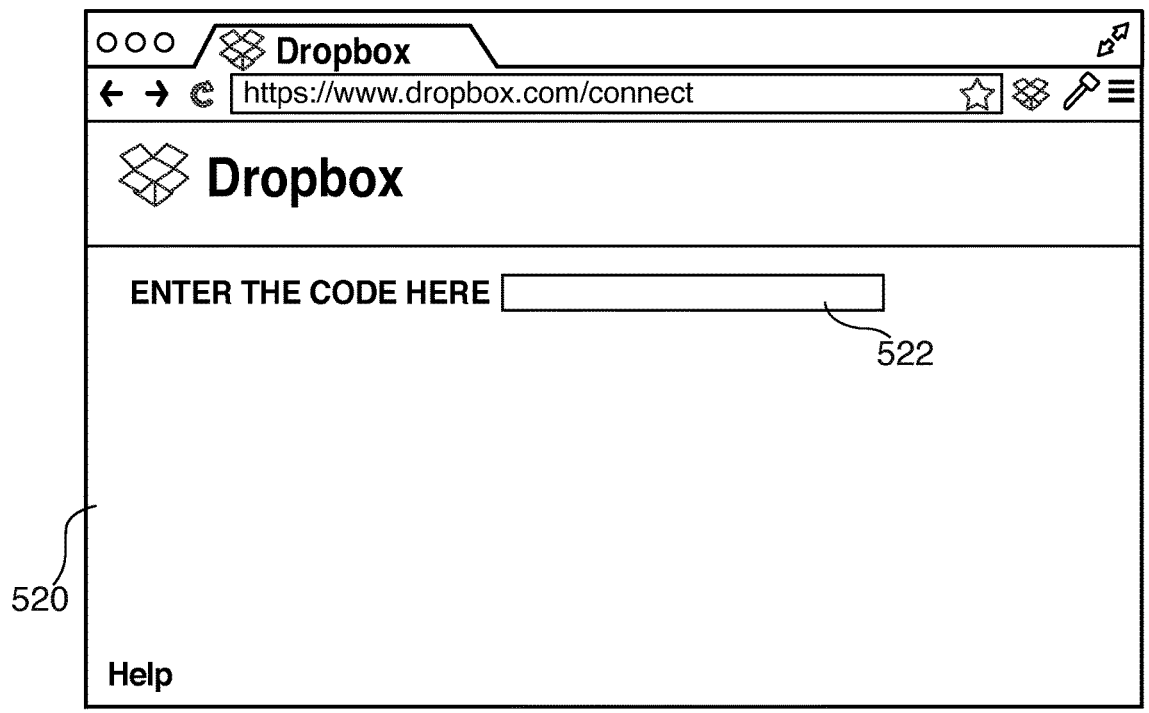
FIGS. 5A and 5B are exemplary web pages that may be displayed on a computing device in accordance with various embodiments.
Figure 5B:
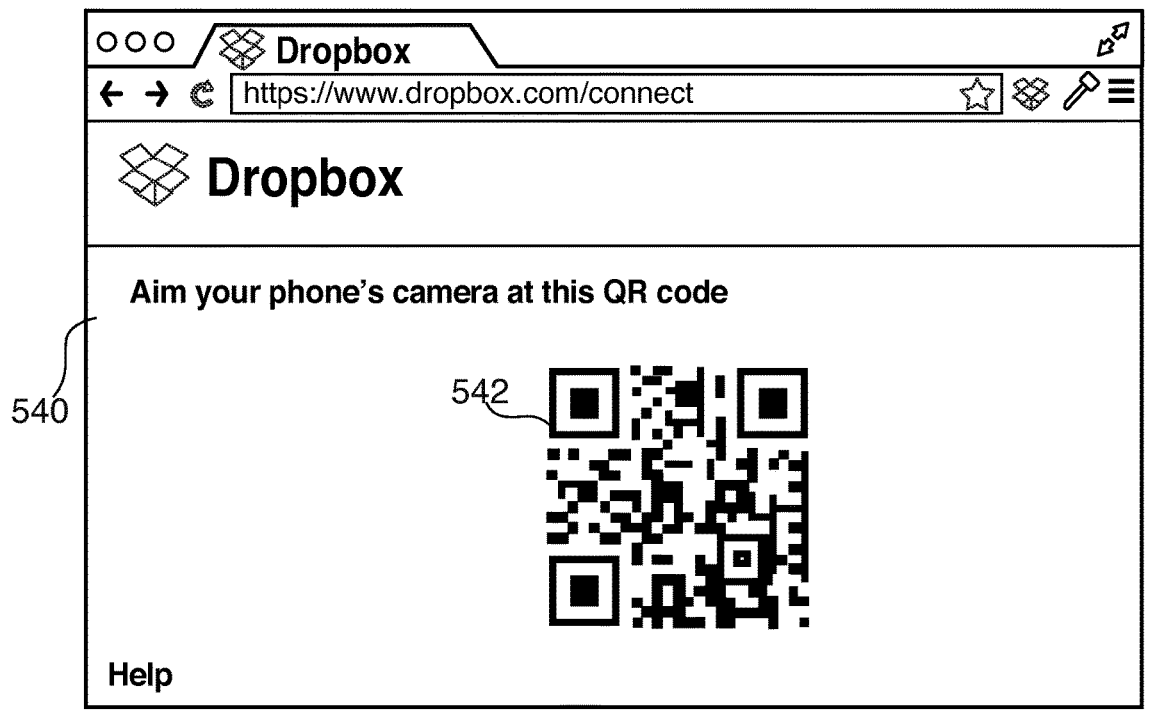

FIG. 5A shows a web page 520 that may be displayed on the computing device when the user follows instruction 422 of FIG. 4A. Similarly, FIG. 5B shows a web page 540 that may be displayed on the computing device when the user follows instruction 442 of FIG. 4B. As shown in FIG. 5A, web page 520 includes a field or box 522 that may receive text inputs. For example, the user may enter the predefined data or code included in instruction 424 of FIG. 4A into field 522. When the code is entered and submitted to the content management system, the content management system may determine that the user intends to install the software application onto the computing device, and that the mobile device is to be used as a guide for the installation process.

In at least one embodiment, the content management system may be configured to monitor whether the code is received from the computing device within a predefined time. If the code is not received after the predefined amount of time (e.g., if the user has not entered and submitted the code on the computing device), then the content management system may cause the code to become expired, and any subsequent attempt to use the code may fail. In some embodiments, however, the content management system may also monitor the network for connection problems, such that if an identified network connection issue is likely the reason the code is not received after the predefined amount of time, the content management system may wait until network connection is resolved, and will refrain from expiring the code.

As shown in FIG. 5B, web page 540 includes predefined data or code 542, which may be transmitted from the content management system to the computing device for display on the web page when the web browser application of the computing device is directed to the URL of FIG. 4B. This code may, for example, be a Quick Response ("QR") code that may be scanned or otherwise captured by the mobile device. When the code is acquired by the mobile device, the mobile device may relay this event to the content management system (e.g., over a network connection), and the content management system may then determine that the user intends to install the software application onto the computing device, and that the mobile device is to be used as a guide for the installation process.

It should be appreciated that the code of FIG. 5B may be similar to the code of FIG. 4A. For example, content management system may generate the code randomly or near randomly, and may correlate the code with a user account (e.g., a user account associated with the mobile device). As another example, the generated code may be active for a predefined time span, and while the generated code is active, the user may be able to download—onto a nearby computing device—an installer and/or metadata identified by the code, which establishes that the software is to be installed on the computing device for the user account.

Metadata may be provided with the installer, and may identify the user account to allow the application to be installed and setup on the computing device without the user having to enter in their credentials (e.g., login/password for the user account) or any further verification during or after the installation. Thus, in some embodiments, downloading and setup of the client to the computing device may be streamlined, thus incentivizing the user to add the computing device to his or her account on the content management system.

Figure 6A:
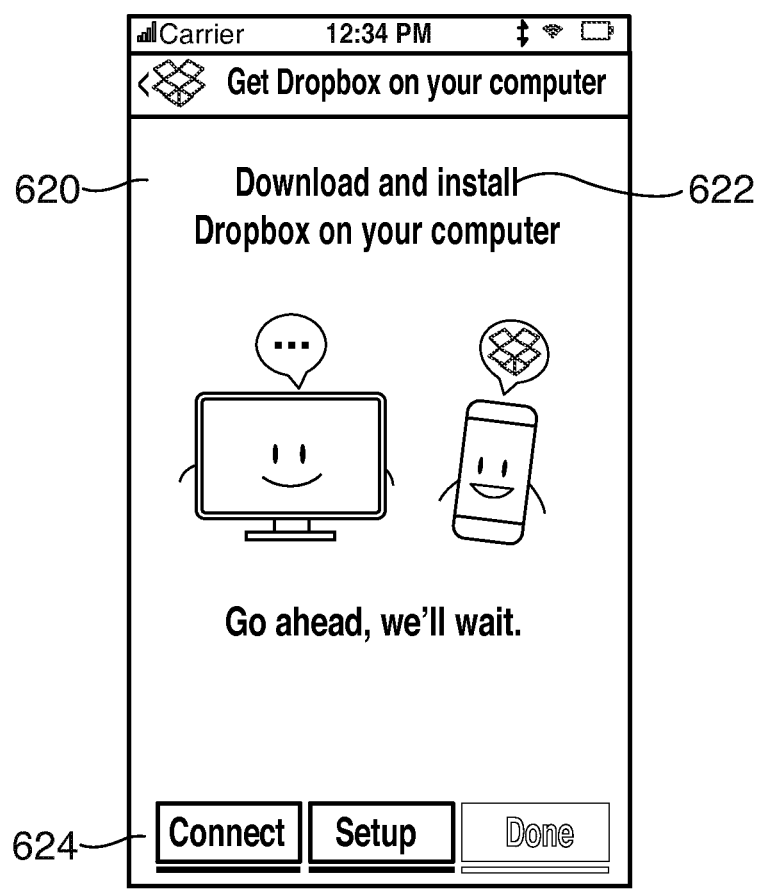
FIG. 6A is another exemplary user interface that may be displayed on a mobile device in accordance with various embodiments.
Figure 6B:
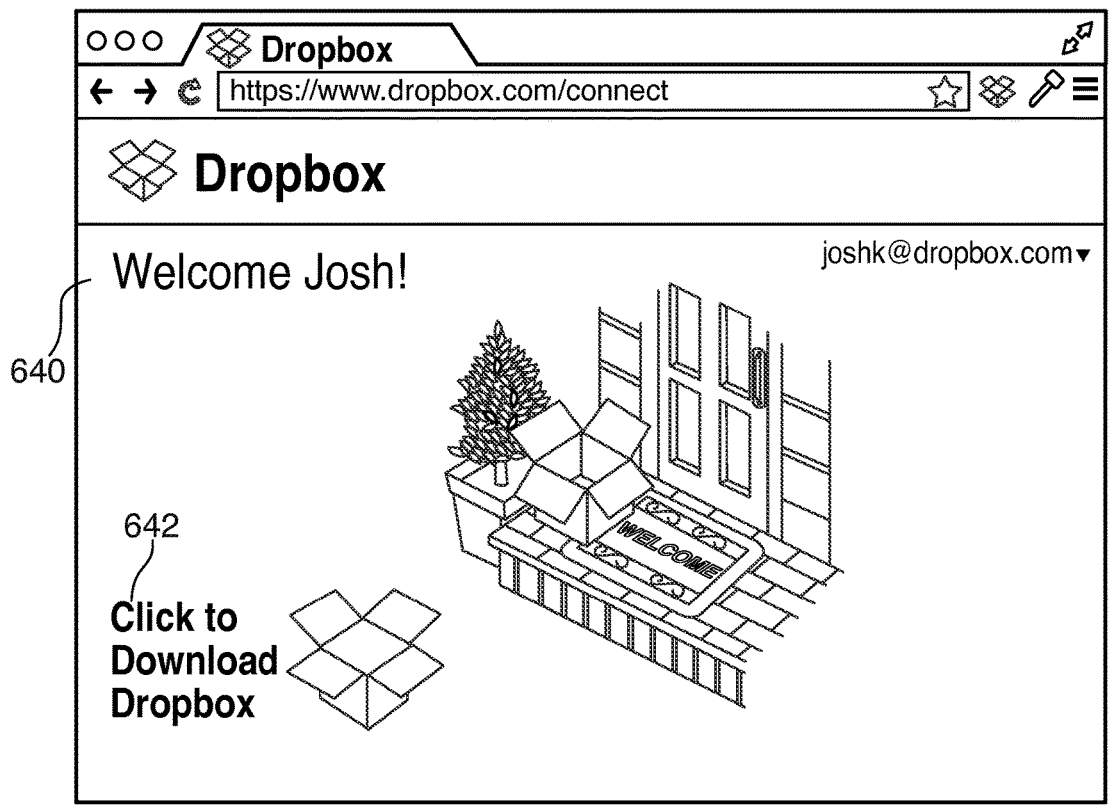
FIG. 6B is another exemplary web page that may be displayed on a computing device in accordance with various embodiments.

FIG. 6A shows an interface 620 that may be subsequently displayed by the mobile device, and FIG. 6B shows a web page 640 that may be substantially simultaneously displayed by the computing device. Interface 620 may include an instruction 622 to a user to download and install the installer for the software application onto the computing device. In various embodiments, the content management system may monitor the download and installation process (e.g., by polling the computing device for status updates) and may provide the progress to the mobile device, thus employing the mobile device as a guide in the installation process. Accordingly, interface 620 may also include a progress indicator 624 (e.g., the same as or similar to indicator 426) that indicates a current progress of a device linking and software application installation procedure. As shown in FIG. 6A, for example, the procedure may be in a "Setup" stage.

As shown in FIG. 6B, web page 640 may include an option 642 to download the installer. When the user selects option 642, the computing device may download the installer from the content management system. In at least one embodiment, the user may be directed to a particular location to download the installer using a File Transfer Protocol (FTP), may enter the code as a password, and may be permitted access to the installer for download in this manner.

Figure 6C:
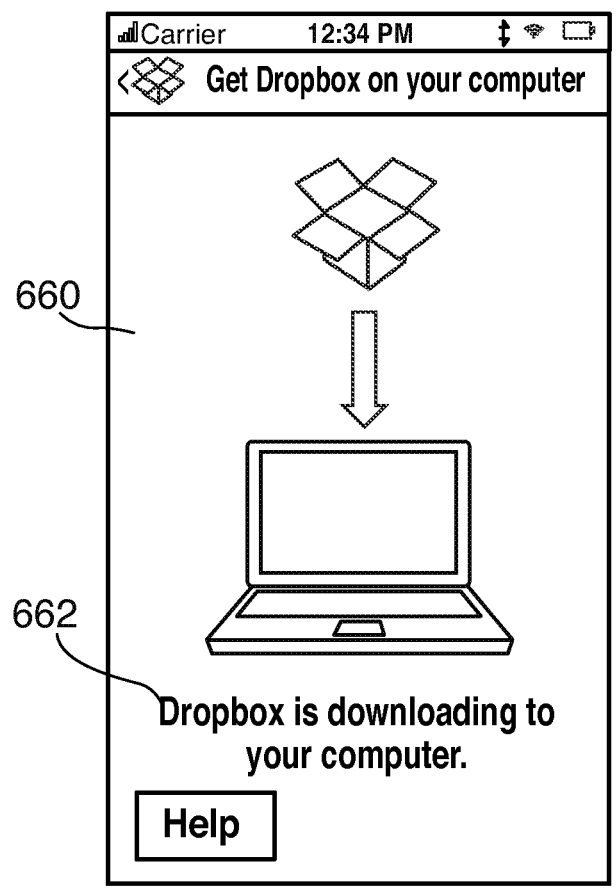
FIGS. 6C and 7A are further exemplary user interfaces that may be displayed on a mobile device in accordance with various embodiments.

FIG. 6C shows an interface 660 that may be displayed by the mobile device after the user selects option 642 in interface 640. As shown in FIG. 6C, interface 660 may include a progress message 662 indicating the current status of the installation (e.g., that the installer is currently being downloaded to the computing device).

Figure 7A:
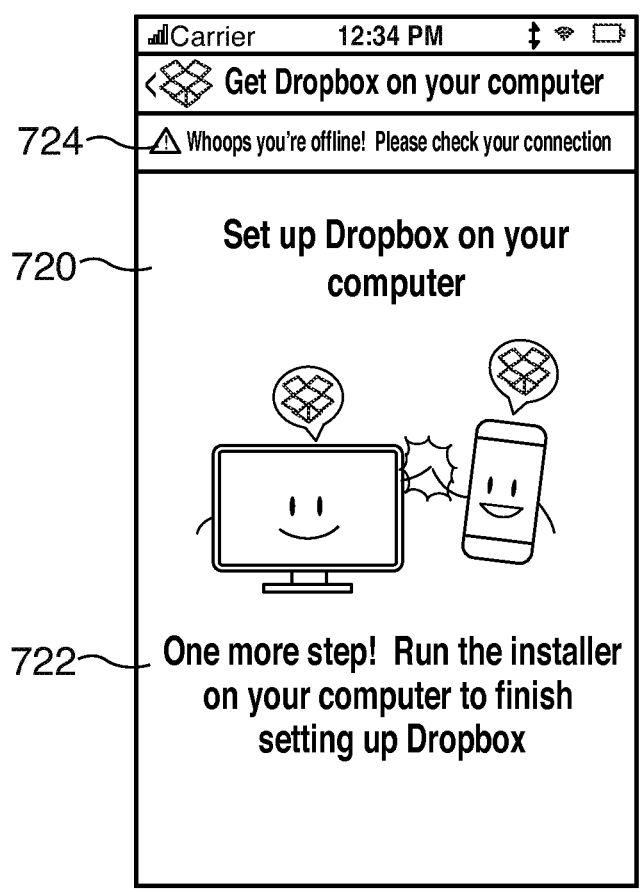
Figure 7B:
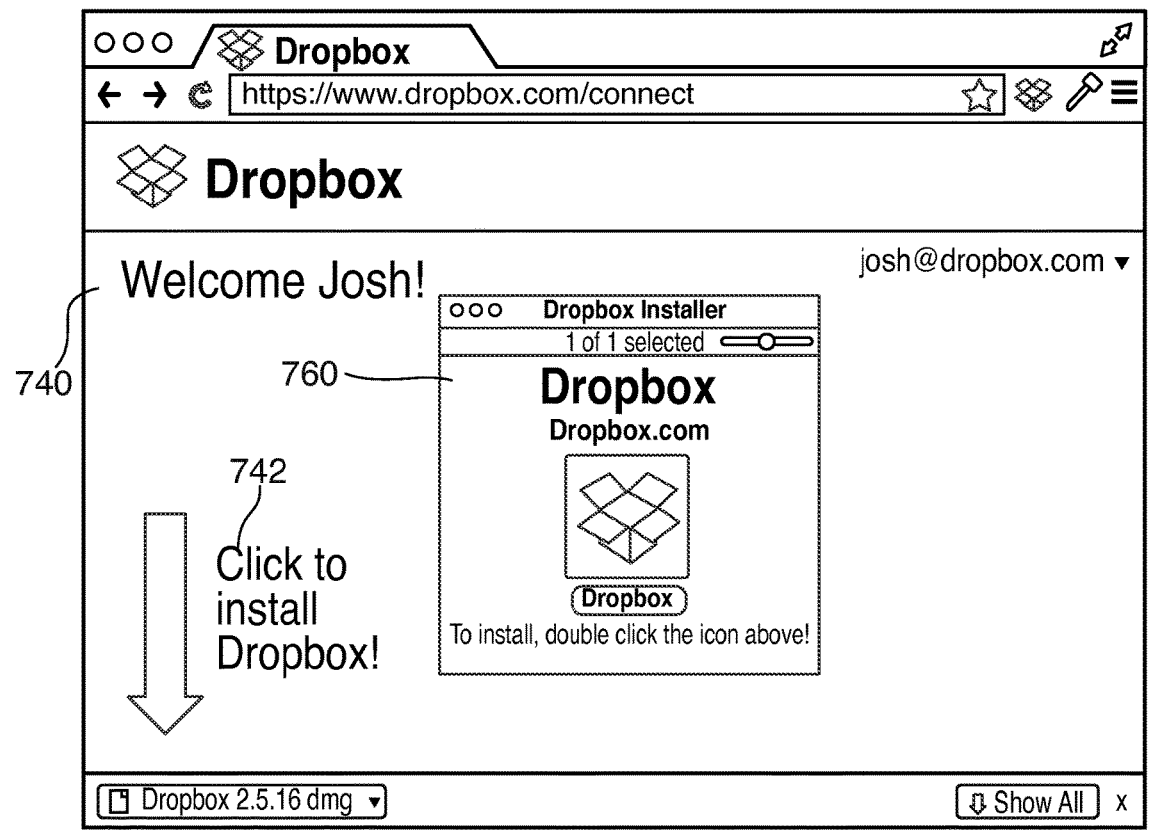
FIG. 7B is yet another exemplary web page that may be displayed on a computing device in accordance with various embodiments.

FIG. 7A shows an interface 720 that may be displayed on the mobile device after the installer is successfully downloaded to the computing device. FIG. 7B shows a web page 740 that may also be displayed on the computing device after the download. As described above, the content management system may update the mobile device on the overall installation progress. For example, when the download is complete, the content management system may send one or more messages to the mobile device indicative of this, and may cause the mobile device to display interface 720. As shown in FIG. 7A, interface 720 may include an instruction 722 to the user to run or execute the downloaded installer on the computing device. In at least one embodiment, if the mobile device somehow loses connection with the content management system, a banner 724 may also be displayed. As shown in FIG. 7A, for example, banner 724 may include text indicating that the mobile device is, or has gone, offline, and instruction 722 may still remain displayed within the user interface relevant to the last update on the progress of the installation.

Figure 8:
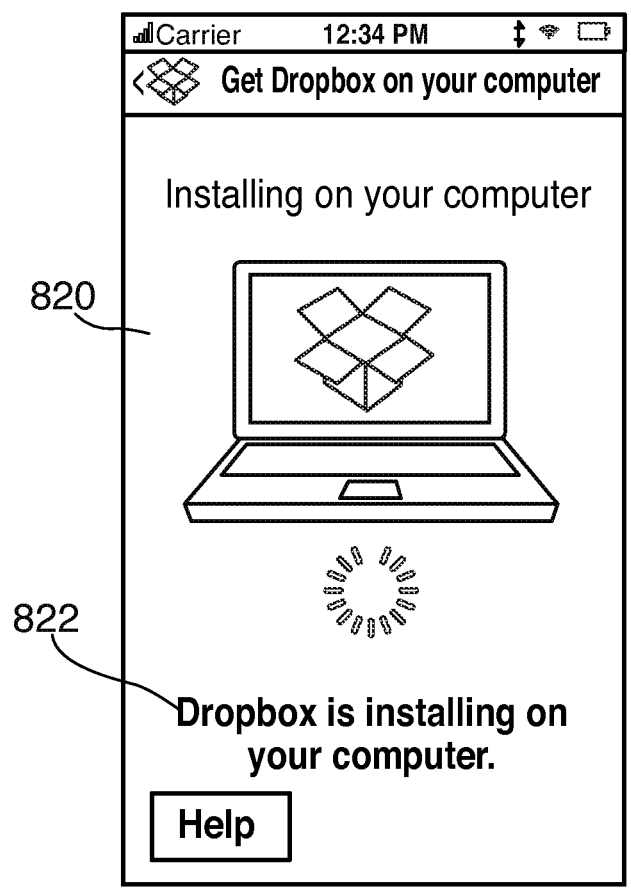
FIGS. 8, 9A, and 9B are yet further exemplary user interfaces that may be displayed on a mobile device in accordance with various embodiments.

When the user selects the downloaded installer to be executed by the computing device, an interface 760 may be displayed instructing a user to initiate the setup of the installer. During the installation process, the content management system may send one or more messages to the mobile device that may cause another interface to be displayed. FIG. 8 shows an interface 820 that may be displayed on the mobile device during the installation. As shown in FIG. 8, interface 820 may include a progress indicator 824 indicative of the current status of the installation process.

Figure 9A:
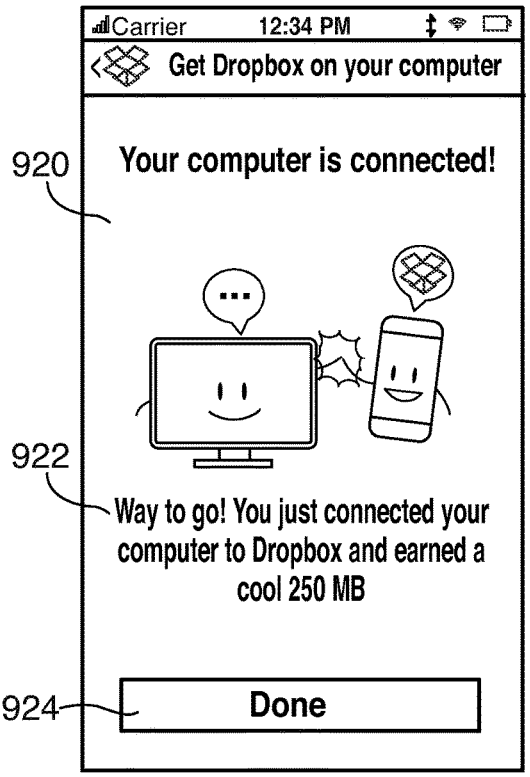
Figure 9B:
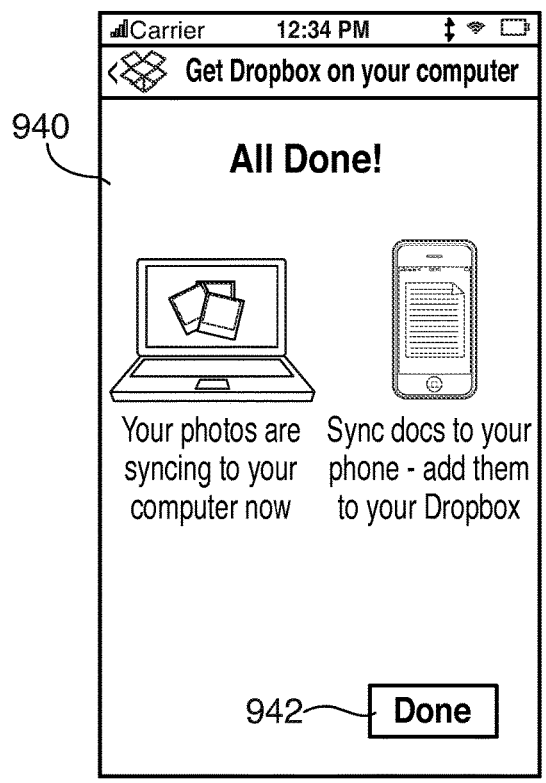
Figure 9C:
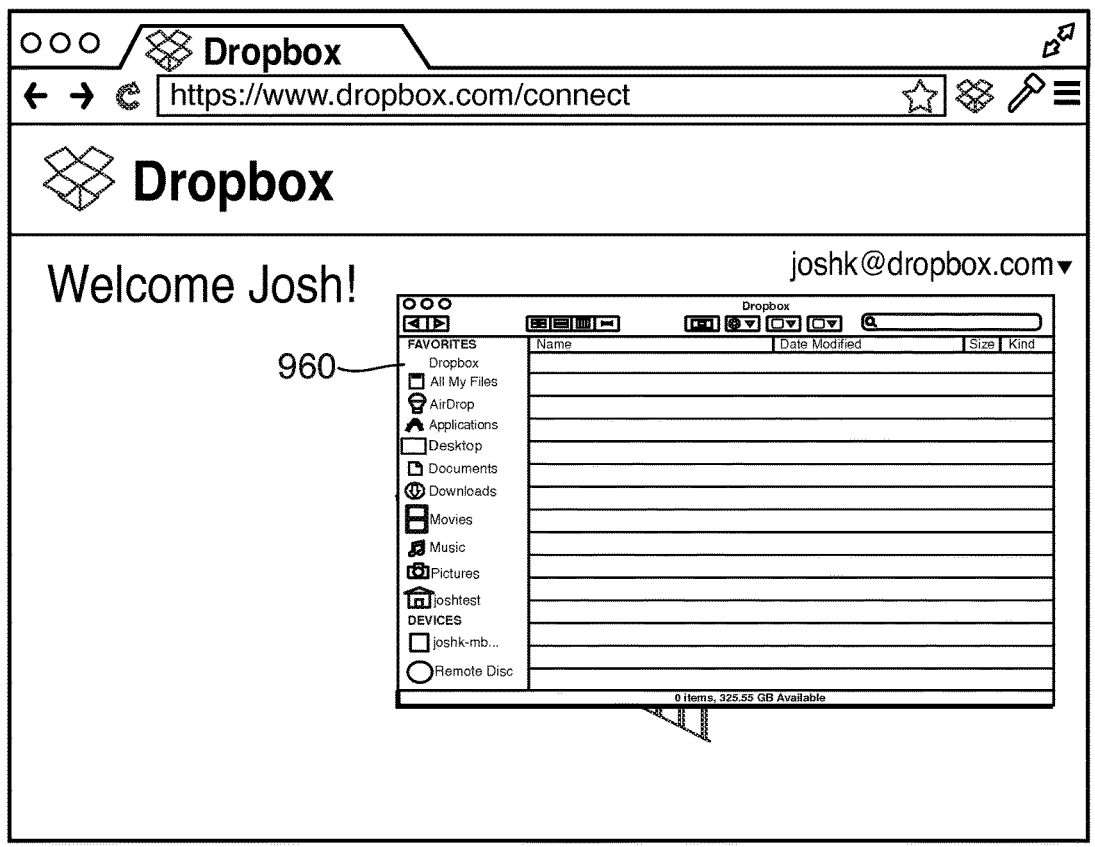
FIG. 9C is still another exemplary web page that may be displayed on a computing device in accordance with various embodiments.

The content management system may monitor the installation and send one or more messages to the mobile device when the installation is complete. FIGS. 9A and 9B show respective interfaces 920 and 940 that may be displayed on the mobile device after the installation is complete, and FIG. 9C shows a window 960 associated with the software application after the installation. As shown in FIG. 9A, interface 920 may include a message 922 indicative of successful installation of the software application on the computing device. Interfaces 920 and 940 may also include respective options 924 and 942 to end use of the mobile device as the guide.

Figure 10:
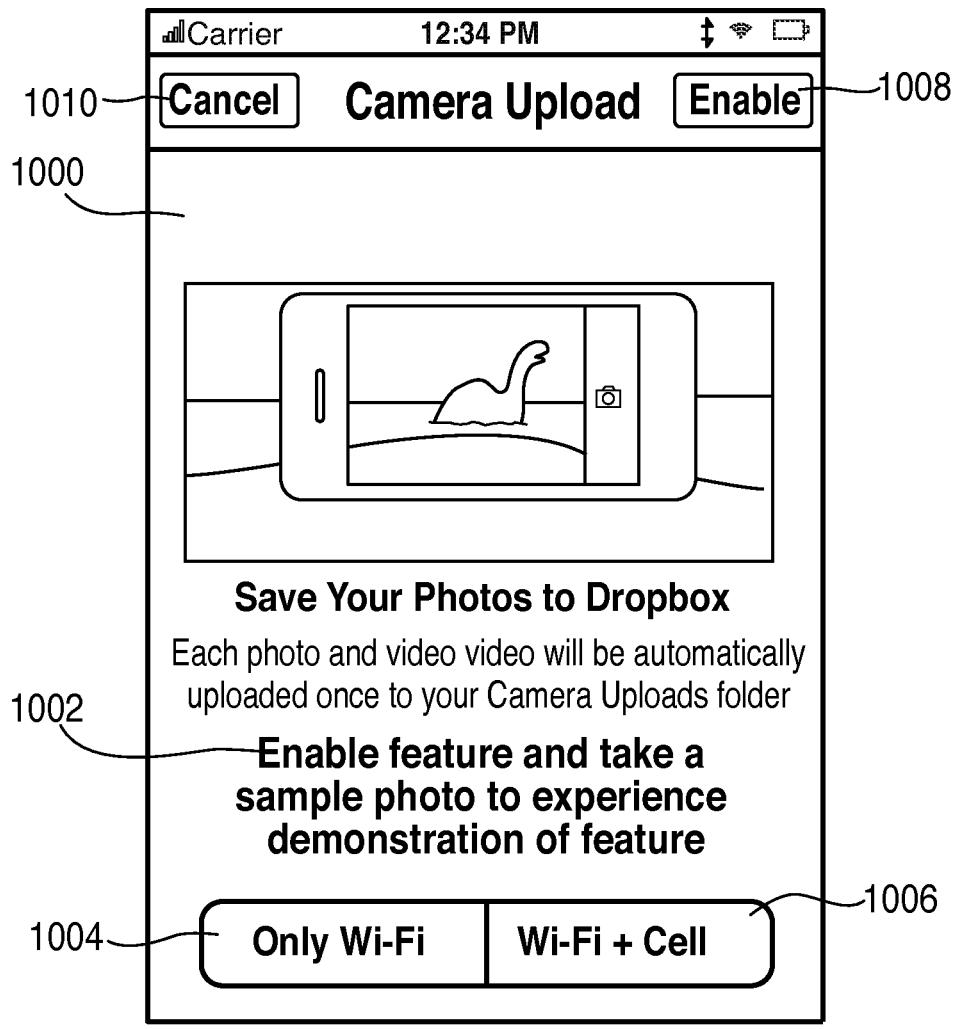
FIGS. 10-12 are still further exemplary user interfaces that may be displayed on a mobile device in accordance with various embodiments.
Figure 11:
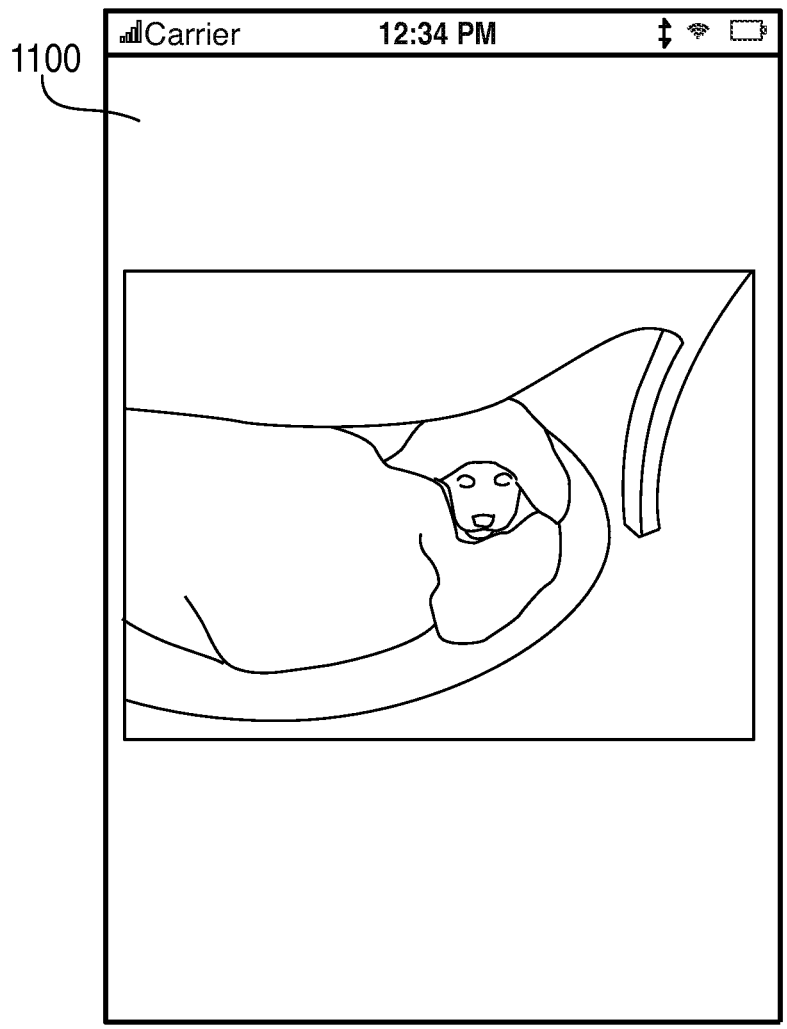
Figure 12:
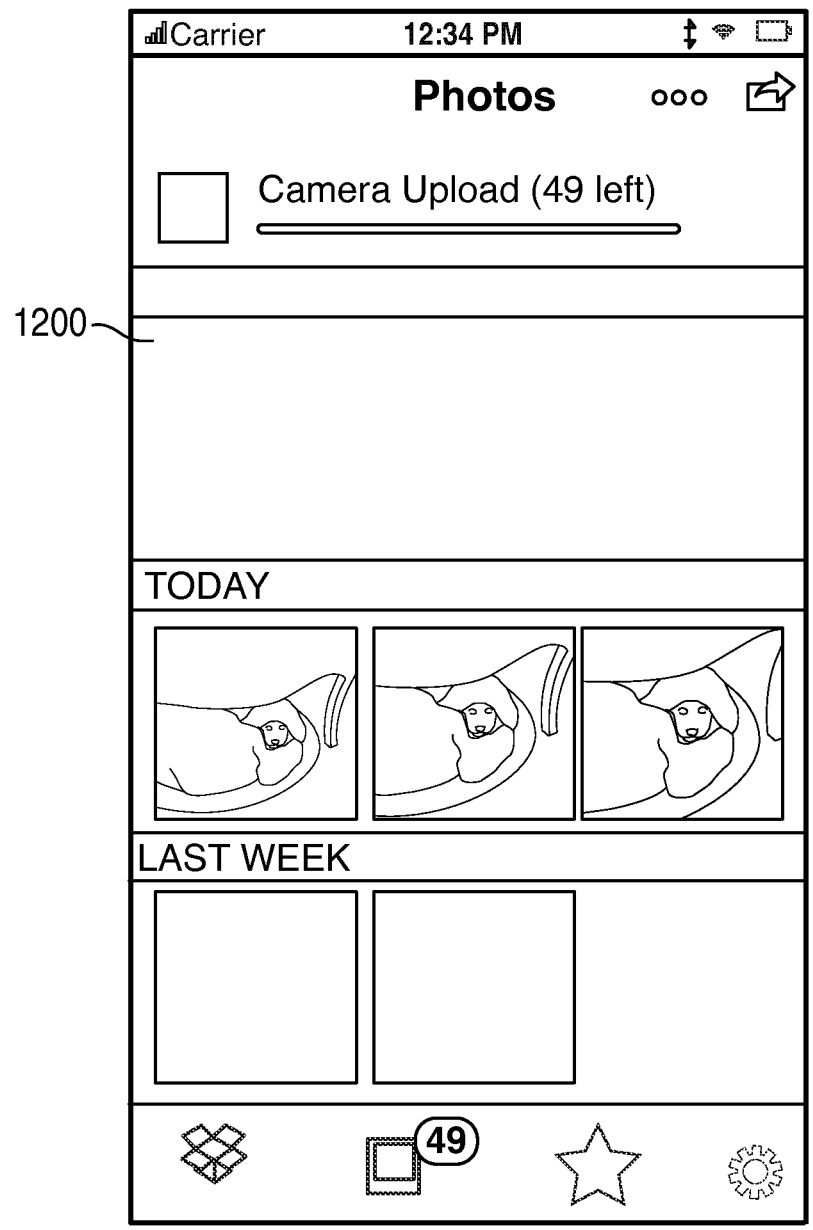

As described above with respect to FIGS. 6A-6C, 7A, 7B, 8, 9A, and 9B, the content management system may send up-to-date information to the mobile device regarding the progress of the installation to the mobile device. In addition to, or in alternative to, the progress information, the content management system may send demonstration information of one or more features of the software application to the mobile device. It should be appreciated that the content management system may either send the actual demonstration information directly to the mobile device, or may send a command that triggers the mobile device to retrieve the demonstration information (e.g., from the mobile device's own storage or from a remote server) to be displayed. FIGS. 10-12 show respective exemplary user interfaces 1000, 1100, 1200 (e.g., web pages) that may provide demonstrations of one or more features regarding the client application of the mobile device and/or the software application installed to the computing device. The demonstration may relate to any suitable feature of the application. For example, the software application may include a synchronization feature that synchronizes content locally stored on the mobile and computing devices. In this example, any recorded content item may then be stored locally on the mobile device, and the computing device may display the content item as also being stored in a corresponding location on the computing device.

As shown in FIG. 10, user interface 1000 may include instructions 1002 for requesting a demonstration of a "Camera Upload" feature. As indicated in user interface 1000, each photo is uploaded to the "Camera Upload" folder and is accessible on each device with the client application for the user account. With user controls "Only Wi-Fi" 1004 and "Wi-Fi+Cell" 1006 on user interface 1000, the user may select settings for the desired network connection when enabling this feature. User control "Enable" 1008 allows the user to enable the feature and experience a demonstration of the feature. User control "Cancel" 1010 allows the user to cancel the feature.

As shown in FIG. 11, user interface 1100 presents a photo (e.g., of a dog on a couch), which a user has uploaded in response to the message shown in the user interface of FIG. 10. User interface 1100 may be displayed after the user selects instructions 1002 from user interface 1000 and after the photo is taken. The photo may be stored within the "Photos" or "Camera Upload" directory on the first device.

As shown in FIG. 12, interface 1200 presents recent photographs uploaded by the user. As may be seen, the photograph of FIG. 11 appears as the middle photograph under the "TODAY" heading, and is shown as having been uploaded to the content management system.

Figure 13:
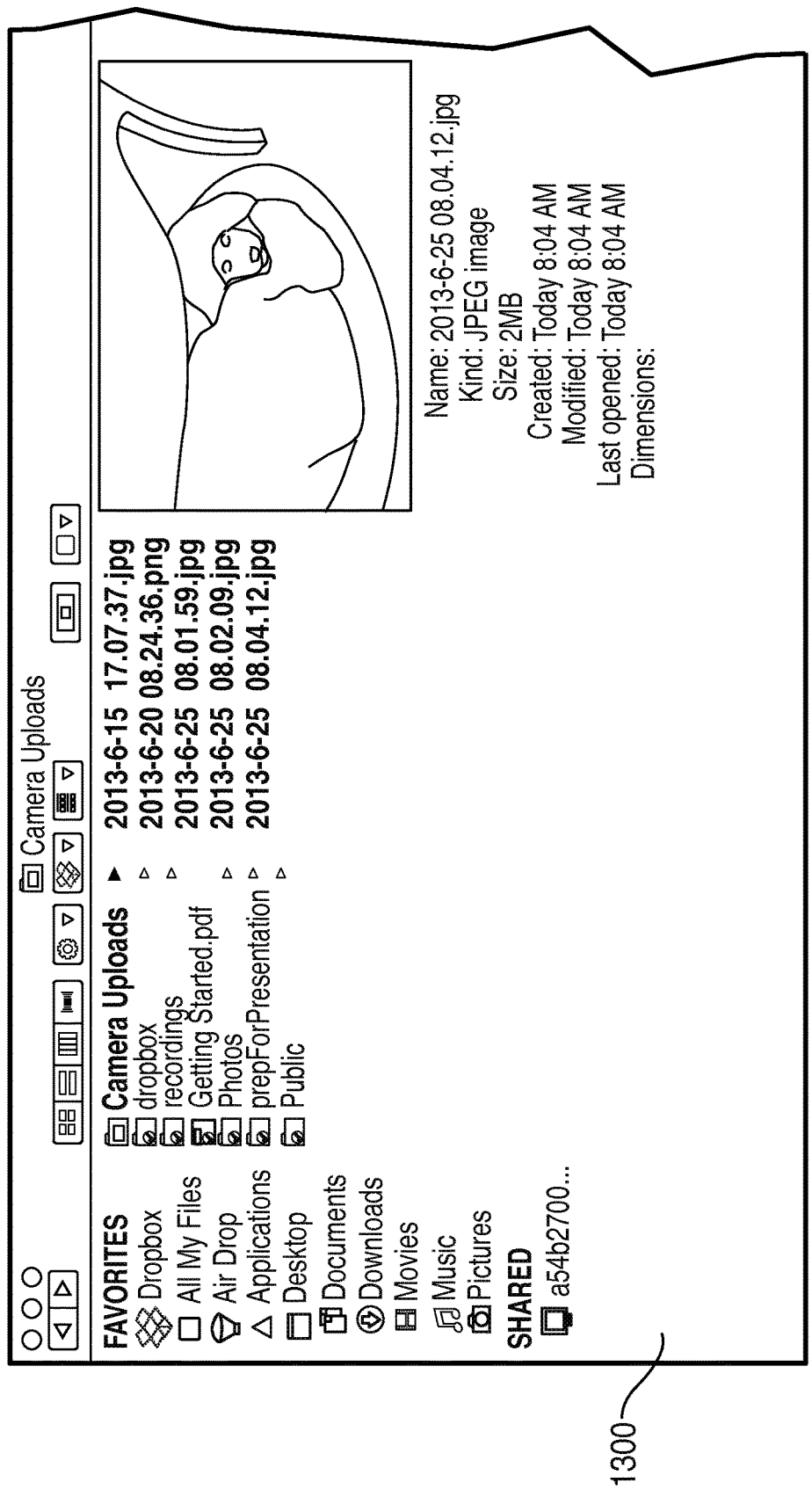
FIG. 13 is yet still another exemplary web page that may be displayed on a computing device in accordance with various embodiments.

FIG. 13 is an exemplary user interface 1300 that may be associated with the software application installed on the computing device. As shown in FIG. 13, interface 1300, may include a listing of features or folders as well as content (e.g., documents, images, and the like) that have been created or uploaded to the user's account. As also shown in FIG. 13, interface 1300 may provide a demonstration of the "Camera Uploads" feature with a photo uploaded from mobile device and accessible on the computing device, which may include displaying a preview of the photo along with various information about the photo.

In at least one embodiment, the client application on the mobile device may be configured to periodically query or poll (e.g., over a network connection) the content management system for any of the installation progress and feature demonstration information. The content management system may respond to the queries with update information, and the client application may correspondingly select content for display on the user interface in accordance with the responses. For example, the response from content management system may include enumerated type data (e.g., having a set of named values that serve as constants) that the mobile device may use to retrieve web pages with instructions and/or demonstrations of software features for display within its user interface. In particular, the mobile device may store a table (e.g., in a database in memory) of response instructions and corresponding values (e.g., "Instruction1"='0', "Instruction2"='1', etc.) that reference to information to be displayed on the interface of the mobile device. For example, when an "Instruction1" corresponding to a '0' value is received by the mobile device from the content management system, the mobile device may identify that interface 620 (e.g., as a web page or as text and graphics prestored in memory on the mobile device) is to be displayed, and may, for example, retrieve and load a web page as interface 620, or retrieve and combine appropriate text and graphics (e.g., from the mobile device's own memory or from a remote server) as interface 620.

Figure 14:
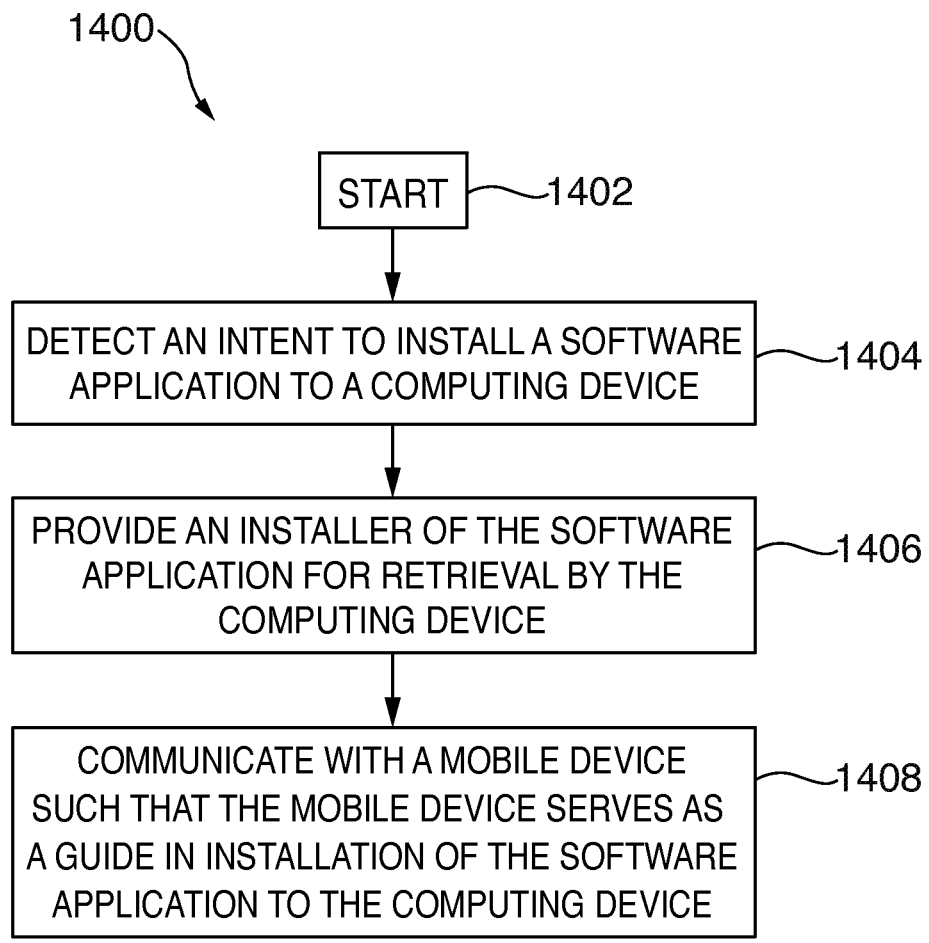
FIG. 14 is an exemplary flowchart of a process for facilitating installation of a software application in accordance with various embodiments.

FIG. 14 is an exemplary flowchart of a process 1400 in accordance with various embodiments of the present invention. Process 1400 may be implemented, for example, by a content management system or software provider (e.g., content management system 100) to facilitate installation of a software application. For example, process 1400 may be employed to use a mobile device (e.g., device 102*a*) as a guide for software application installation on a different computing device (e.g., device 102*b*), for demonstration of the application's features, and the like. The mobile device may include a client application, such as a content management application (e.g., content management application 114*a*) or a web application displayable via a web browser (e.g., web browser 116*a*), configured to expose functionality provided by, and to thereby interact with, the content management system. The client application resident on the mobile device may allow the mobile device to communicate with the content management system (e.g., via an interface module, such as interface module 104, and/or other modules of the provider) to facilitate use of the mobile device as a guide. For example, the mobile device may communicate with a synchronization module of the content management system (e.g., synchronization module 122), which may then synchronize locally stored data between the mobile and computing devices (e.g., once the computing device has loaded the software application appropriate for it), provide the mobile device with demonstration information on synchronization functionality of the content management system, or various other features. The client application may communicate with the content management system in any suitable manner, such as, for example, by submitting and receiving requests and other data to and from the content management system.

Continuing with reference to FIG. 14, process 1400 may begin at step 1402. In particular, the process may begin while the content management system is communicatively coupled (e.g., over a network) to the mobile device. For example, process 1400 may begin after the mobile device detects a user request to install the software application onto the computing device. At step 1404, the process may include detecting an intent to install the software application to the computing device. For example, content management system 100 may detect an intent to install the software application to device 102b.

The intent may be detected in a variety of ways. In at least one embodiment, the content management system may detect the intent by determining that predefined data is to be provided to the mobile device, causing the predefined data to be transmitted to the mobile device, and receiving at least a portion of the predefined data from the computing device. The content management system may determine that predefined data is to be provided to the mobile device based on a request received from the mobile device in response to a user selection of any one of options 222, 242, 262, and 282 of FIGS. 2A-2D. The content management system may then prepare and/or cause predefined data to be transmitted to the mobile device for display. As shown in FIG. 4A, for example, the predefined data may include instructions 422 and 424. Alternatively, the content management system may determine that predefined data is to be provided to the mobile device when the mobile and computing devices are determined to be proximate one another, as described above with respect to FIGS. 4A and 4B (e.g., via network connection information, third-party application data, etc.). The content management system may then receive the at least a portion of the predefined data from the computing device by receiving the code (e.g., included in instruction 424) from a web browser application of the computing device. The code may, for example, be entered by a user into the web browser application of the computing device, as described above with respect to FIG. 5A.

In at least another embodiment, the content management system may detect the intent by determining that predefined data is to be provided to the computing device, causing the predefined data to be transmitted to the computing device, and receiving from the mobile device information indicative that the at least a portion of the predefined data has been acquired by the mobile device. The content management system may determine that predefined data is to be provided to the computing device based on a request received from the computing device (e.g., a web browser request to load the particular URL shown in FIG. 4B). The content management system may then cause the predefined data to be transmitted to the computing device for display on a web browser application (e.g., web page 540 as shown in FIG. 5B). As shown in FIG. 5B, for example, the predefined data may be a unique QR code (e.g., code 542). The content management system may then receive from the mobile device at least a portion of the QR code indicative that at least a portion of the QR code has been scanned or otherwise captured by the mobile device.

Continuing with reference to FIG. 14, at step 1406, the process may include providing an installer of the software application for retrieval by the computing device. For example, content management system 100 may provide an installer of the software application for retrieval by the computing device via a web page (e.g., web page 640 described above with respect to FIG. 6B).

At step 1408, the process may include communicating with the mobile device such that the mobile device serves as a guide in installation of the software application to the computing device. For example, content management system 100 may communicate with the mobile device by sending one or more messages to the mobile device as the installation progresses, as described above with respect to FIGS. 6A-6C, 7A, 7B, 8, 9A, 9B, and/or to demonstrate one or more features of the client application of the mobile device, as described above with respect to FIGS. 10-12.

Figure 15:
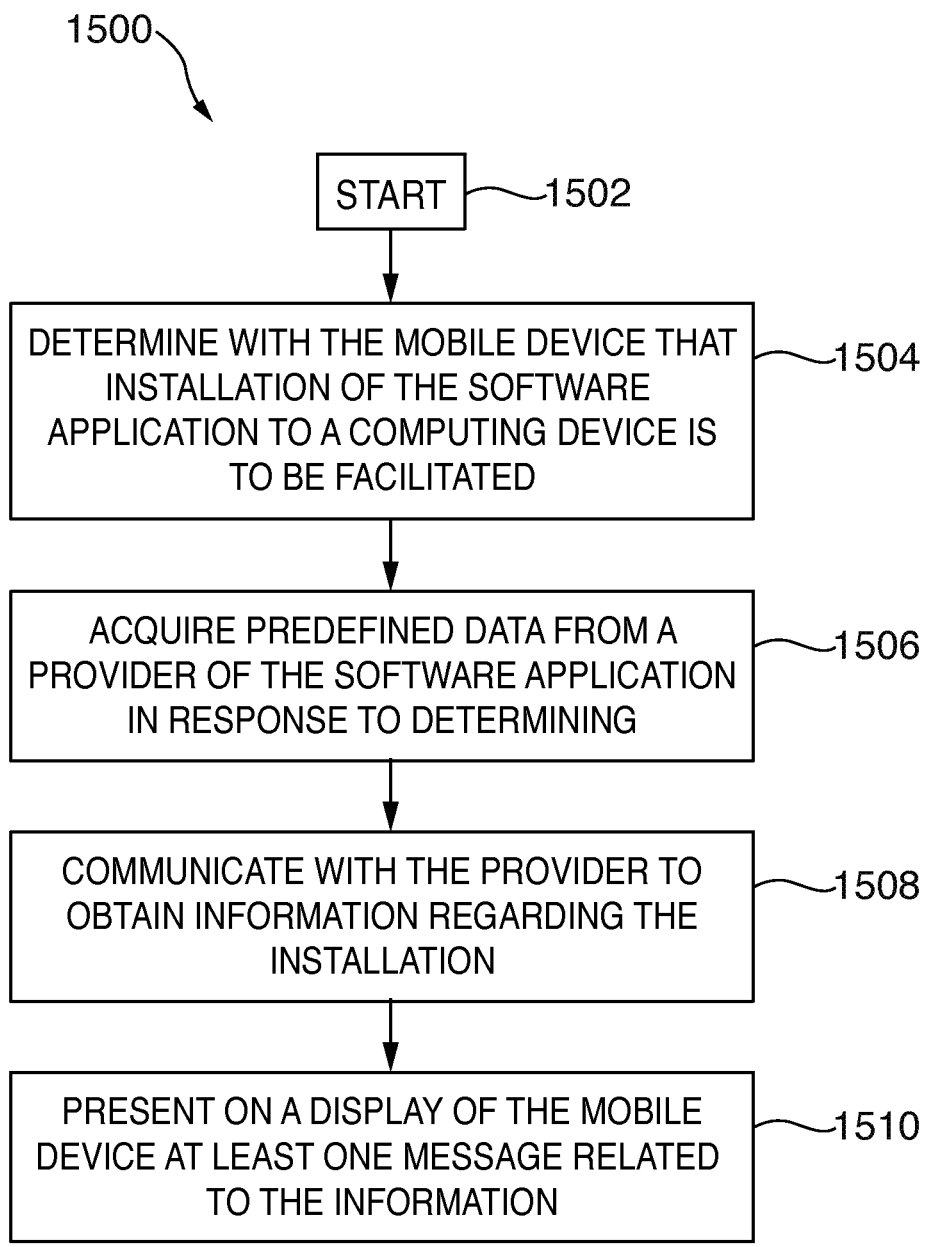
FIG. 15 is an exemplary flowchart of a process for using a mobile device as a guide in installation of a software application in accordance with various embodiments.

FIG. 15 is an exemplary flowchart for a process 1500 in accordance with various embodiments. Process 1500 may be implemented by a client application installed on a mobile device (e.g., device 102a) that allows the mobile device to serve as a guide during installation of a software application to a computing device (e.g., device 102b). Process 1500 may, for example, be performed by the client application as a complement to process 1400 of FIG. 14.

Process 1500 may begin at step 1502. At step 1504, the process may include determining with the mobile device that installation of the software application to the computing device is to be facilitated. For example, the process may include determining with device 102a that installation of the software application to device 102b is to be facilitated. In at least one embodiment, the mobile device may determine this when a user request to facilitate the installation is received (e.g., via selection of an option), as described above with respect to FIGS. 2A-2D. In at least another embodiment, the mobile device may determine that the installation is to be facilitated when it is determined that the mobile and computing devices are in proximity to one another, as described above with respect to FIGS. 4A and 4B.

At step 1506, the process may include acquiring predefined data from a provider of the software application in response to determining. For example, the process may include acquiring predefined data from content management system 100 in response to determining that the installation is to be facilitated, as described above with respect to FIG. 4A. At step 1508, the process may include communicating with the provider to obtain information regarding the installation, and at step 1510, the process may include presenting on a display of the mobile device at least one message related to the information. For example, the process may include communicating with content management system 100 to obtain information regarding the installation, and presenting on the display of the mobile device at least one message related to the information, as described above with respect to FIGS. 6A-6C, 7A, 7B, 8, 9A, and 9B.

Figure 16:
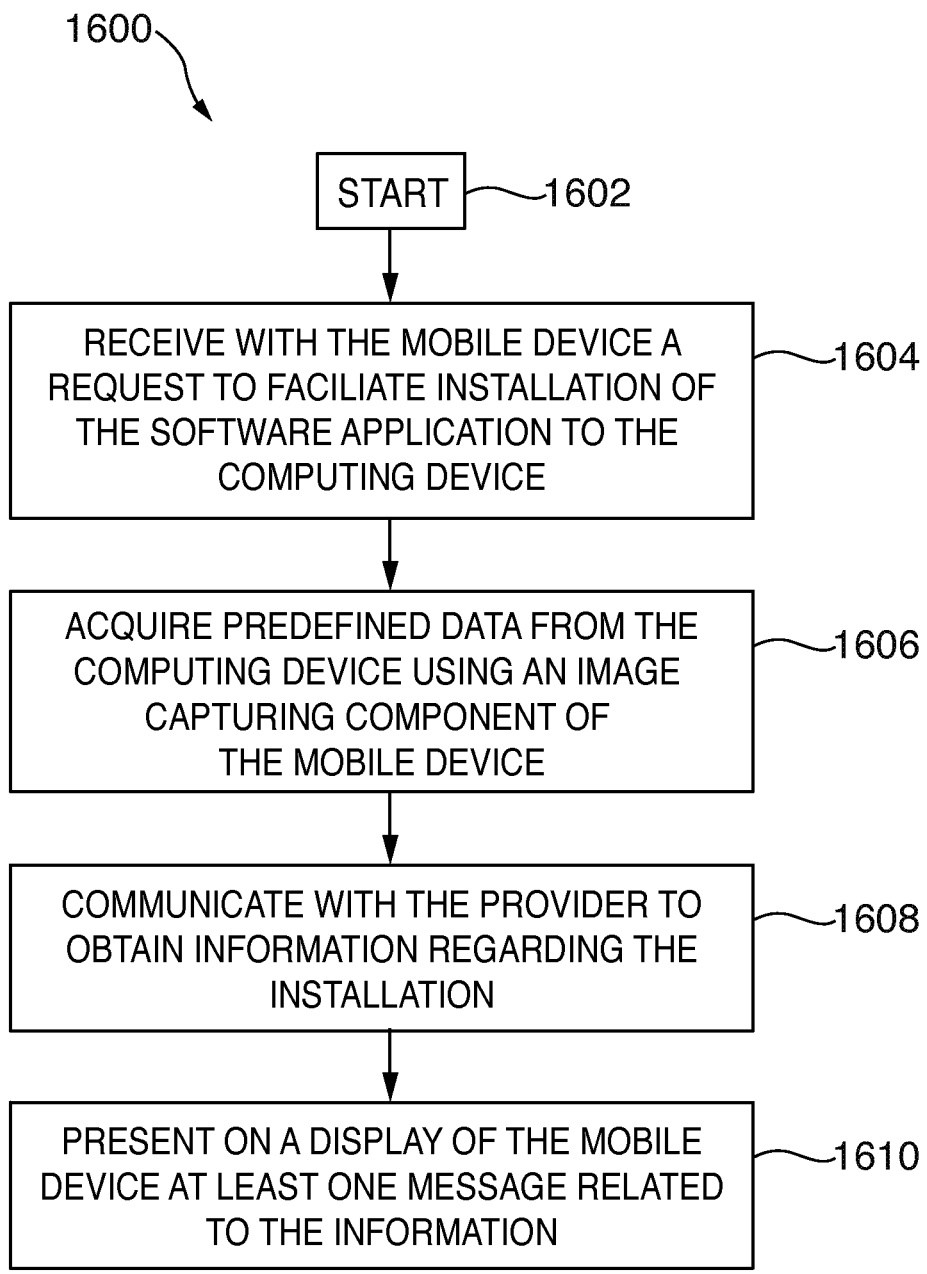
FIG. 16 is an exemplary flowchart of another process for using a mobile device as a guide in installation of a software application in accordance with various embodiments.

FIG. 16 is an exemplary flowchart for a process 1600 in accordance with various embodiments. Process 1600 may be similar to process 1500, and may be implemented by a client application installed on a mobile device (e.g., device 102a) that allows the mobile device to serve as a guide during installation of a software application to a computing device (e.g., device 102b). Process 1600 may, for example, be performed by the client application as a complement to process 1400 of FIG. 14.

Process 1600 may begin at step 1602. At step 1604, the process may include receiving with the mobile device a request to facilitate installation of the software application to the computing device. For example, the process may include receiving a user selection of an option to facilitate installation of the software application to the computing device, as described above with respect to FIGS. 2A-2B.

At step 1606, the process may include acquiring predefined data from the computing device using an image capturing component of the mobile device. For example, the process may include acquiring a QR code from the computing device using a camera of the mobile device, as described above with respect to FIG. 5B. At step 1608, the process may include communicating with the provider to obtain information regarding the installation, and at step 1610, the process may include presenting on a display of the mobile device at least one message related to the information. For example, the process may include communicating with content management system 100 to obtain information regarding the installation, and presenting on the display of the mobile device at least one message related to the information as described above with respect to FIGS. 6A-6C, 7A, 7B, 8, 9A, and 9B.

Exemplary Systems

In exemplary embodiments of the present invention, any suitable programming language may be used to implement the routines of particular embodiments including, but not limited to, the following: C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time.

Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for facilitating installation of software applications, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A system comprising:
a communications component at an online content management system configured to communicate with external devices; and
a processor configured to:
receive, at the online content management system, from a client application of a software provider that is installed on a mobile device, a request to install a corresponding software application of the software provider on a computing device;
determine that a predefined data is to be provided to the mobile device, wherein the predefined data includes a unique code and metadata that identifies a user account associated with a user of the mobile device;
determine that the predefined data is to be provided to the computing device;
direct the communications component to transmit the predefined data to the computing device;
direct the communications component to transmit the predefined data to the mobile device;
receive, at the online content management system via the client application on the mobile device, at least a portion of the predefined data from the computing device;
receive, from the mobile device, information indicative that at least a second portion of the predefined data has been acquired by the mobile device, wherein the predefined data has been acquired wirelessly from the computing device;
query, via the communications component, the mobile device for a status between the mobile device and computing device;
receive, at the online content management system, the status from the mobile device;
provide, via the communications component, an installer of the corresponding software application to the computing device based on the status; and
communicate, via the communications component, with the mobile device, such that the mobile device serves as a guide to installing the corresponding software application on the computing device.

2. The system of claim 1, wherein the processor is configured to determine that the predefined data is to be provided to the mobile device based on a request received from the mobile device for the predefined data.

3. The system of claim 1, wherein the processor is configured to receive the at least a portion of the predefined data by receiving the at least a portion of the predefined data from a web browser application of the computing device.

4. The system of claim 1, wherein the predefined data comprises a Quick Response ("QR") code.

5. The system of claim 1, wherein the processor is configured to determine that the predefined data is to be provided to the computing device based on a request from the computing device for the predefined data.

6. The system of claim 1, wherein the processor is configured to provide the installer by directing the communications component to send webpage content having an option for retrieving the installer to the computing device.

7. The system of claim 1, wherein the status comprises any one of:
   information regarding a network connection between the mobile and computing devices; and
   information regarding geographic locations of the mobile and computing devices.

8. The system of claim 7, wherein the status comprises information regarding the network connection between the mobile and computing devices, and wherein the network connection comprises anyone of a local area network ("LAN") connection, a wide area network ("WAN") connection, and a wireless local area network ("WLAN").

9. The system of claim 1, wherein the processor is configured to direct the communications component to communicate with the mobile device by directing the communications component to transmit to the mobile device, information regarding installation of the corresponding software application.

10. The system of claim 9, wherein the processor is further configured to:
   determine a progress of the installation, wherein the information is based at least in part on the determined progress.

11. The system of claim 9, wherein the information is configured to cause the mobile device to display at least one of:
   (i) at least one message instructing a user to download the installer onto the computing device;
   (ii) at least one notice indicative of a status of the installation of the corresponding software application; and
   (iii) a demonstration of at least one feature of the corresponding software application.

12. The system of claim 11, wherein the information comprises data of an enumerated type, and wherein a value of the data serves as a reference for the mobile device to identify which of the at least one message, the at least one notice, and the demonstration to display.

13. A method comprising:
   receiving, at a client application of an online content management system installed on a mobile device, a request for installation of a corresponding software application of the online content management system to a computing device is to be facilitated, wherein the online content management system directs a communications component of the online content management system to transmit predefined data to the computing device and the mobile device and wherein receiving includes:
   determining that the predefined data is to be provided to the mobile device from the computing device, wherein the predefined data includes a unique code and metadata that identifies a user account associated with a user of the mobile device;
   acquiring the predefined data from the online content management system in response to determining data is to be provided to the mobile device;
   transmitting, to the online content management system via the client application on the mobile device, at least a portion of the predefined data from the computing device;
   transmitting, from the mobile device to the online content management system, information indicative that at least a portion of the predefined data has been acquired by the mobile device, wherein the portion of the predefined data has been acquired wirelessly from the computing device;
   transmitting a status, to the online content management system, between the mobile device and computing device in response to a query from the online content management system;
   communicating, with the online content management system, to obtain information regarding the installation based on the status; and
   presenting, on a display of the mobile device, at least one message related to the information.

14. The method of claim 13, wherein determining that the installation is to be facilitated comprises one of:
   receiving a user request to facilitate the installation; and
   determining that the mobile device is in close proximity to the computing device.

15. The method of claim 13, further comprising:
   causing a request for the predefined data to be transmitted to a provider; and
   displaying the acquired predefined data on the display.

16. The method of claim 13, wherein the at least one message comprises at least one of (i) a notice instructing a user to download the software application onto the computing device, (ii) a notice indicative of a status of the installation of the software application, and (iii) a demonstration of at least one feature of the software application.

17. A non-transitory computer readable medium storing instructions that, when executed by at least one process of a mobile device, cause the mobile device to:
   receive a request, via a client application of an online content management system installed on the mobile device, to facilitate installation of a corresponding software application of the online content management system to a computing device, wherein the online content management system directs a communications component of the online content management system to transmit predefined data to the computing device and the mobile device and the online content management system receives, via the client application on the mobile device, at least a portion of the predefined data from the computing device;
   acquire the predefined data from the computing device using an image capturing component of the mobile device, wherein the predefined data includes a unique code and metadata that identifies a user account associated with a user of the mobile device;
   transmit, from the mobile device to the online content management system, information indicative that at least a portion of the predefined data has been acquired by the mobile device;
   transmit a status between the mobile device and computing device to the online content management system, in response to a query from the online content management system;
   communicate with the online content management system to obtain information regarding the installation based on the status; and
   present, on a display of the mobile device, at least one message related to the information.

18. The non-transitory computer readable medium of claim 17, wherein the request comprises a user selection of an option to facilitate the installation.

19. The non-transitory computer readable medium of claim 17, wherein the image capturing component is a camera.

20. The non-transitory computer readable medium of claim 17, wherein the predefined data comprises a Quick Response ("QR") code.

21. The non-transitory computer readable medium of claim 17, wherein the at least one message comprises at least one of (i) a notice instructing a user to download the software application onto the computing device, (ii) a notice indicative of a status of the installation of the software application, and (iii) a demonstration of at least one feature of the software application.

* * * * *